US010289571B2

(12) United States Patent
Yamaizumi

(10) Patent No.: US 10,289,571 B2
(45) Date of Patent: May 14, 2019

(54) AUTHENTICATION APPARATUS, AUTHENTICATION METHOD, AND NON-TRANSITORY COMPUTER READABLE MEDIUM

(71) Applicant: FUJI XEROX CO., LTD., Tokyo (JP)

(72) Inventor: Wataru Yamaizumi, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 109 days.

(21) Appl. No.: 15/243,760

(22) Filed: Aug. 22, 2016

(65) Prior Publication Data

US 2017/0270059 A1 Sep. 21, 2017

(30) Foreign Application Priority Data

Mar. 18, 2016 (JP) ................. 2016-054667

(51) Int. Cl.
*G06F 12/14* (2006.01)
*H04L 29/06* (2006.01)
*H04W 12/06* (2009.01)
*H04L 9/32* (2006.01)
*G06F 21/44* (2013.01)

(52) U.S. Cl.
CPC ........ *G06F 12/1458* (2013.01); *H04L 9/3273* (2013.01); *H04L 29/06802* (2013.01); *H04L 63/0853* (2013.01); *H04W 12/06* (2013.01); *G06F 21/445* (2013.01); *G06F 2212/1052* (2013.01)

(58) Field of Classification Search
None
See application file for complete search history.

(56) References Cited

U.S. PATENT DOCUMENTS

| | | | | |
|---|---|---|---|---|
| 8,918,844 | B1 * | 12/2014 | Friedman | G06F 21/42 726/4 |
| 9,350,717 | B1 * | 5/2016 | Siddiqui | H04L 63/08 |
| 2010/0274859 | A1 * | 10/2010 | Bucuk | H04L 63/08 709/206 |
| 2012/0197797 | A1 * | 8/2012 | Grigg | G06Q 20/1085 705/43 |
| 2014/0237236 | A1 * | 8/2014 | Kalinichenko | G06F 21/43 713/168 |
| 2015/0113621 | A1 * | 4/2015 | Glickfield | H04L 63/08 726/7 |

(Continued)

FOREIGN PATENT DOCUMENTS

| | | |
|---|---|---|
| JP | 2002-304376 A | 10/2002 |
| JP | 2009-253389 A | 10/2009 |
| JP | 2013-171509 A | 9/2013 |

*Primary Examiner* — Kaushikkumar M Patel
(74) *Attorney, Agent, or Firm* — Oliff PLC

(57) ABSTRACT

An authentication apparatus includes a memory that stores information regarding a device and other device located in the vicinity of the device in association with each other; a receiving unit that, in a case where there is an authentication request from the device, receives information regarding other device located in the vicinity of the device at a time of the authentication request; and an authentication unit that authenticates the device based on the information regarding the other device stored in the memory and the information regarding the other device that is received by the receiving unit at the time of the authentication request.

14 Claims, 19 Drawing Sheets

(56) References Cited

U.S. PATENT DOCUMENTS

| | | | |
|---|---|---|---|
| 2015/0237026 A1* | 8/2015 | Kumar | H04L 63/08 726/28 |
| 2015/0382195 A1* | 12/2015 | Grim | H04L 63/08 726/4 |
| 2016/0014112 A1* | 1/2016 | Gunning | H04W 4/008 713/159 |
| 2016/0112386 A1* | 4/2016 | Park | H04W 12/04 713/171 |
| 2016/0189136 A1* | 6/2016 | Mercille | G06Q 20/3227 705/44 |
| 2017/0026379 A1* | 1/2017 | Lu | H04L 63/102 |

\* cited by examiner

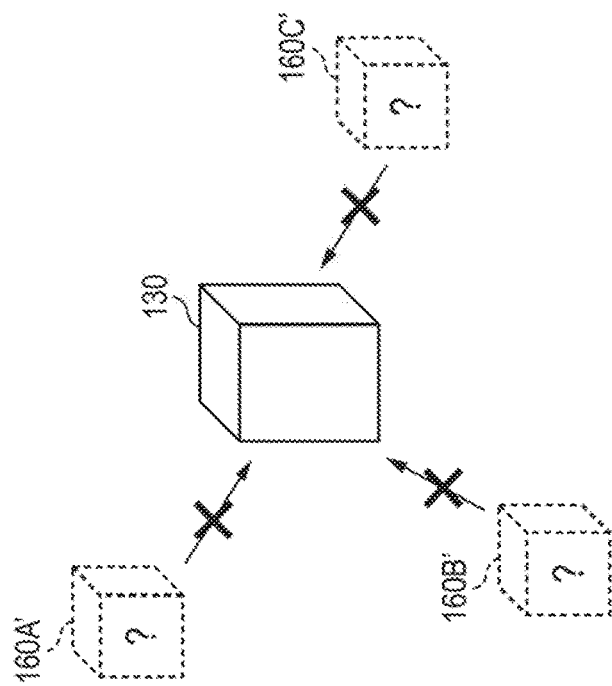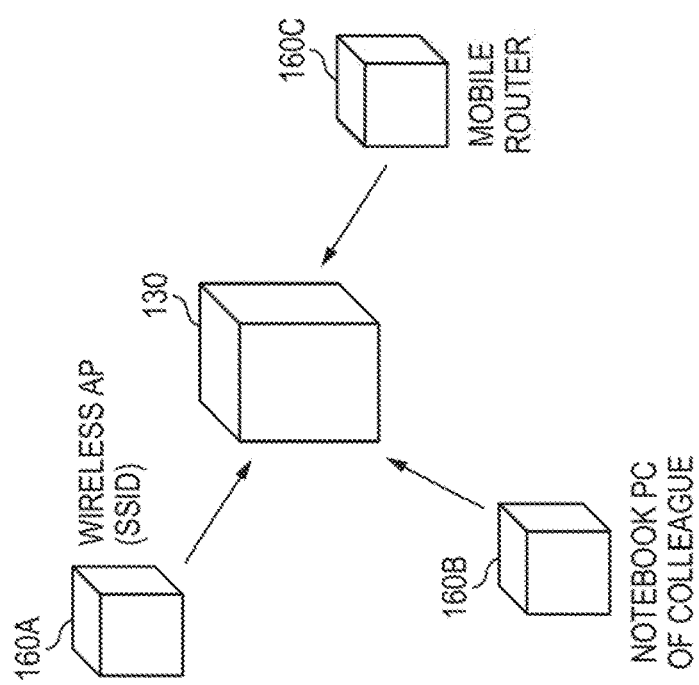

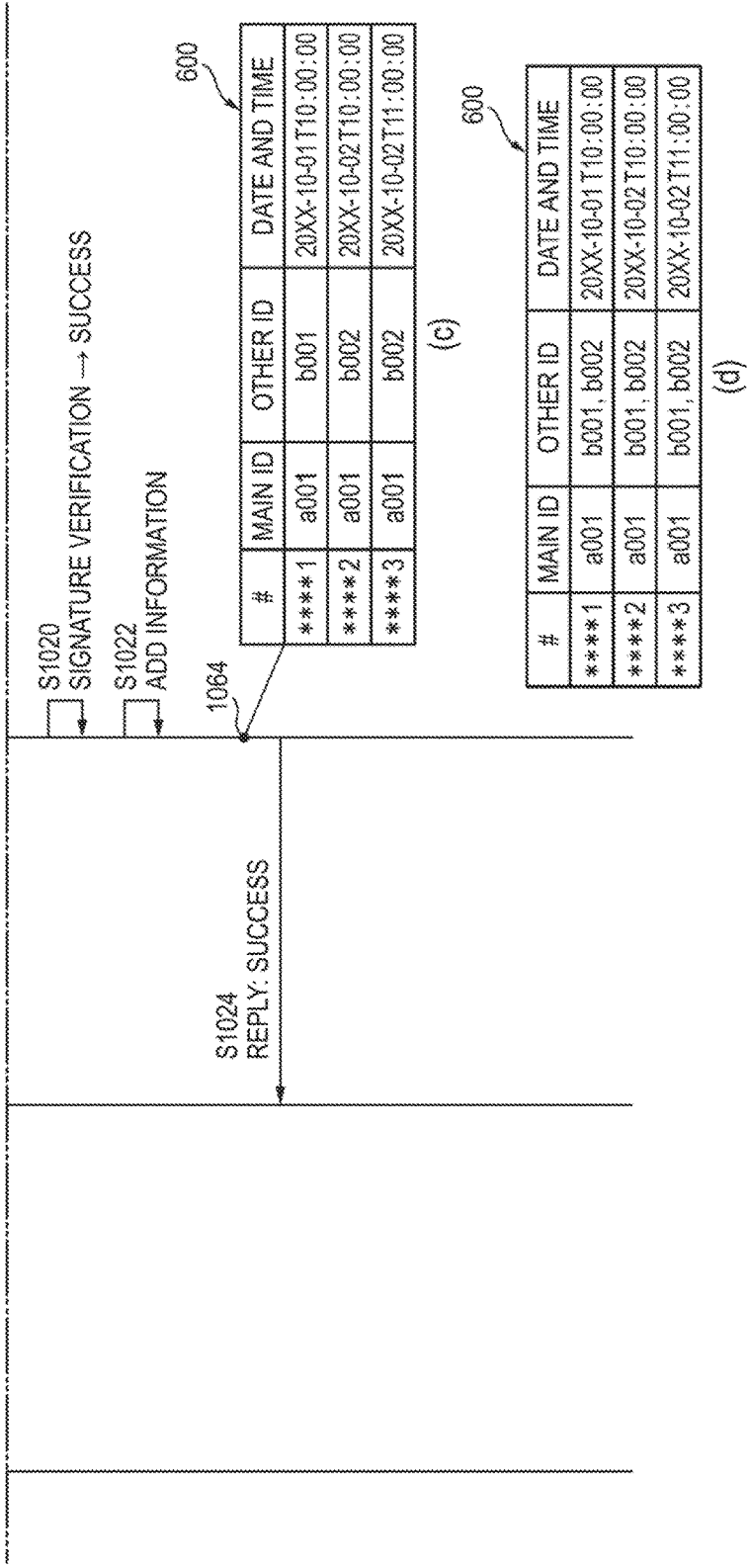

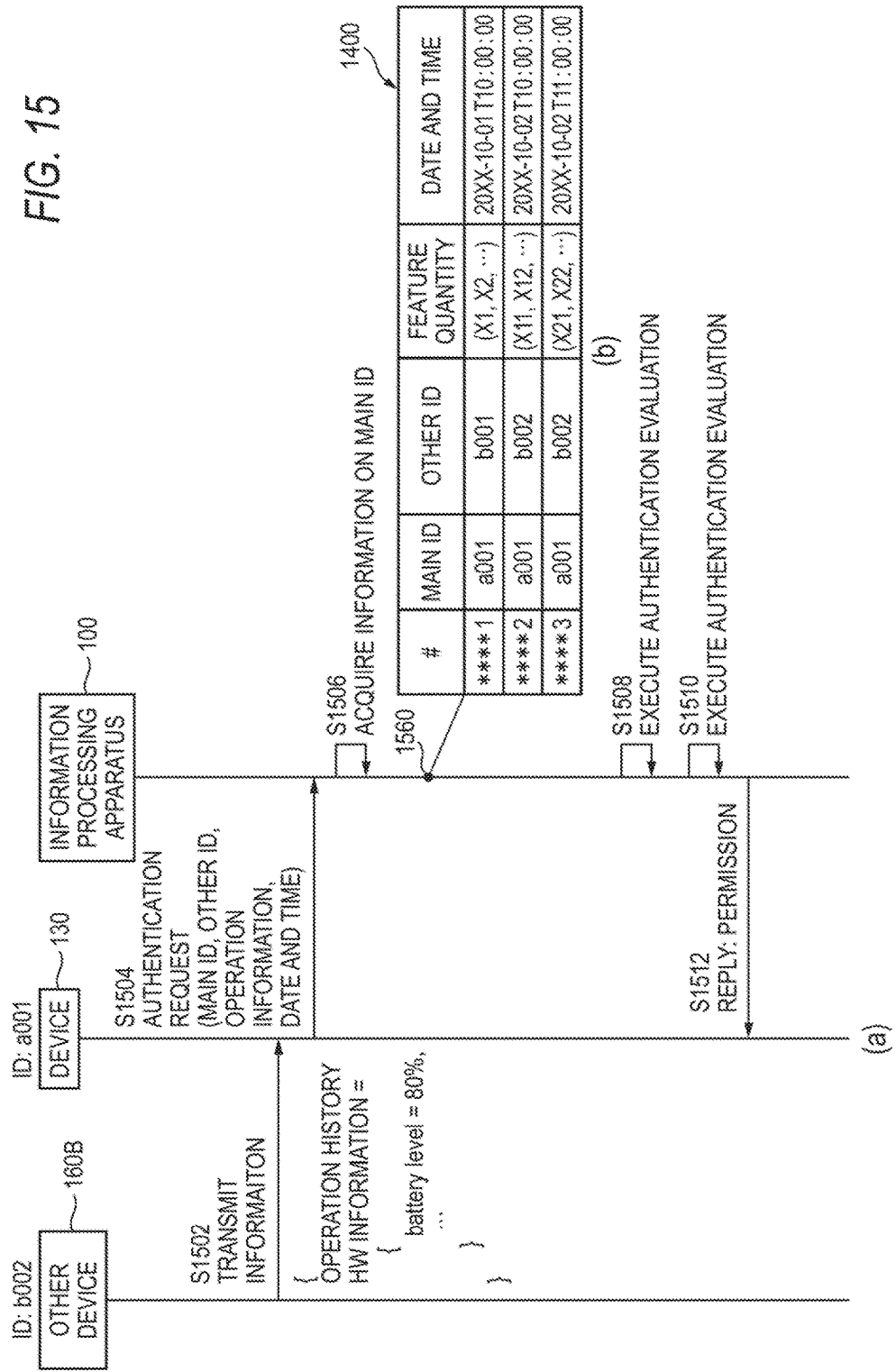

AUTHENTICATION APPARATUS, AUTHENTICATION METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-054667 filed on Mar. 18, 2016.

BACKGROUND

Technical Field

The present invention relates to an authentication apparatus, an authentication method, and a non-transitory computer readable medium.

SUMMARY

According to an aspect of the invention, there is provided an authentication apparatus including: a memory that stores information regarding a device and other device located in the vicinity of the device in association with each other; a receiving unit that, in a case where there is an authentication request from the device, receives information regarding other device located in the vicinity of the device at a time of the authentication request; and an authentication unit that authenticates the device based on the information regarding the other device stored in the memory and the information regarding the other device that is received by the receiving unit at the time of the authentication request.

BRIEF DESCRIPTION OF THE DRAWINGS

Exemplary embodiments of the present invention will be described in detail based on the following figures, wherein:

FIGS. 4A and 4B are explanatory diagrams illustrating an example of a process according to the first exemplary embodiment;

FIG. 15 is a flow chart illustrating an example of a process according to the third exemplary embodiment;

DETAILED DESCRIPTION

Hereinafter, examples of various exemplary embodiments suitable for implementing the invention based on the drawings will be described.

First Exemplary Embodiment

Figure 1:
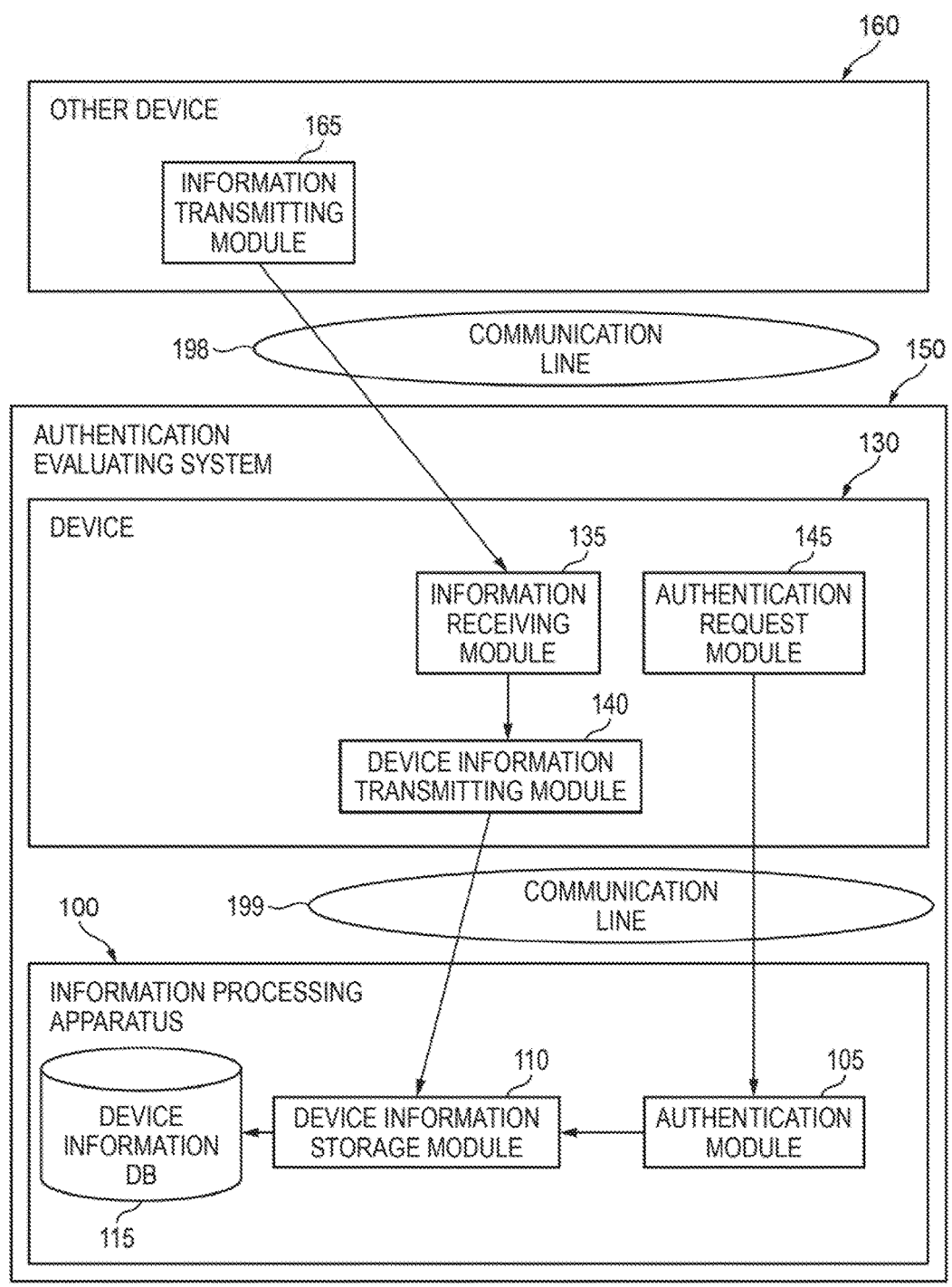
FIG. 1 is a conceptual module configuration diagram for a configuration example of a first exemplary embodiment.

FIG. 1 illustrates a conceptual module configuration diagram for a configuration example of a first exemplary embodiment.

Note that in general, a module refers to a component of software (a computer program) or hardware which is logically separable. Thus, the module in this exemplary embodiment refers to not only a module in the computer program but also a module in the hardware configuration. Therefore, the present exemplary embodiment also provides a description on a computer program for functioning as the module (a program for executing the respective steps in a computer, a program for causing a computer to function as respective units, or a program for realizing the respective functions in a computer), a system and a method. Here, for convenience of explanation, "store", "causes to store", and a statement similar to these are used, but in a case where an exemplary embodiment is a computer program, these statements have a meaning of "storing in a storage device", or "controls so as to store in a storage device." Further, although the module may be in a one-to-one correspondence to a function, one module may be configured with one program, plural modules may be configured with one program, or conversely one module may be configured with plural programs, in the implementation. Further, plural modules may be executed by one computer, or one module may be executed by plural computers in a distributed or parallel environment. One module may include other modules. Further, hereinafter, the term "connection" is used in the case of logical connection (data exchange, an instruction, a reference relationship between data, or the like), in addition to physical connection. The term "predetermined" units being determined before a target process is performed, and includes of course "before the process according to the present exemplary embodiment is started", and even after the process according to the exemplary embodiment is started, if the target processing is not performed yet, the term includes the meaning of being determined according to the situation and state at that time, or according to the situation and state until then. In a case where there are plural "predetermined values", they may be respectively different values, or two or more values (while of course, includes all values) may be the same. Further, a description having a meaning of "in a case of A, B is performed" is used as a meaning of "it is determined whether or not it is A, and in a case where it is determined that it is A, B is performed." However, a case where a determination as to whether or not it is A is not required is excluded.

Further, a system or an apparatus includes a case where the system or the apparatus is realized by a single computer, hardware, device, or the like, in addition to a case where plural computers, hardware, devices are connected by a communication unit such as a network (including one-to-one correspondence communication). "Apparatus" and "System" are used as terms which are synonymous to each other. While of course, the "system" does not include only a social "mechanism" (social system) which is an artificial arrangement.

Further, the system reads information of interest from the storage device, and writes the processing result into the storage device after performing the process, for each process performed by each module or for each process when performing plural processes in the module. Therefore, a description about reading from the storage device before processing and writing to the storage device after processing may be omitted. Here, the storage device may include a hard disk, a random access memory (RAM), an external storage medium, a storage device through a communication line, a register in a central processing unit (CPU), or the like.

In a modern society in which nomad (refers to a work style of working in a variety of locations as well as the office) and free access are in progress, a movement to adopt a business type which is not trapped in workplaces is activated. Inevitably, an opportunity to bring the mobile device is increased, and a scene to access important information such as trade secret information outside the jurisdiction of the company, particularly, in the public place is not uncommon. Therefore, mobile security such as information leak prevention becomes important every year.

It is commonly required to control only employees so as to be able to access a work terminal, and as well as only certain employees so as to be able to access specific information.

At that time, it is necessary to check that the user who wants to use the terminal or service is an employee who is permitted to use it. In this procedure called authentication, reliability for the method and result is important.

An information processing apparatus 100 that is the first exemplary embodiment is an apparatus that authenticates a device 130, and as illustrated in the example of FIG. 1, includes an authentication module 105, a device information storage module 110, and a device information DB 115. Note that the authentication of the device 130 may be a concept including the authentication of a user who uses the device 130, in addition to the authentication of the device 130 itself.

The information processing apparatus 100 and the device 130 are connected through a communication line 199, and the device 130 is connected to another device 160 through a communication line 198. There are plural devices 130 and other devices 160. In particular, the number of other devices 160 capable of communicating with a single device 130 may be plural. It is to be noted that a combination of the information processing apparatus 100 and the device 130 is an authentication evaluating system 150.

The device 130 and other device 160 may be devices which are portable and able to perform wireless communication. For example, a notebook PC, a tablet device, a mobile information communication device (including a mobile phone, a smart phone, a mobile device, a wearable computer and the like) or the like, which have a communication function, is applicable.

Further, the device 130 and other device 160 may be a wireless communication available device which is normally not moved. For example, a copy machine, a facsimile, a scanner, a printer, a multifunction machine (an image processing apparatus having two or more functions of the scanner, the printer, the copy machine, the facsimile and the like), a vending machine, an information appliance, or the like is applicable.

The other device 160 is located in the vicinity of the device 130. Here, "located in the vicinity" refers to that the device 130 and the other device 160 can communicate with each other. More specifically, it refers to that the device 130 and the other device 160 is capable of performing short range wireless communication (communication line 198). Examples of the short range wireless communication include existing standards such as Bluetooth (registered trademark) and a wireless LAN. Peer communication is possible by using WiFi-Direct as a wireless LAN. The standard may be selected considering a radio range according to the use case.

However, all types of wired communication (communication line 198) are not excluded, and a case where a connection is made using a cable of a length which is less than or equal to or less than a predetermined (for example, defined in the standard or the like) cable length is also included.

Incidentally, there is no restriction in the communication line 199 between the device 130 and the information processing apparatus 100 as long as it is communicable. For example, the communication line 199 may be wireless, wired, or a combination thereof, and may be, for example, the Internet, an intranet, or the like as a communication infrastructure.

Figure 6A:
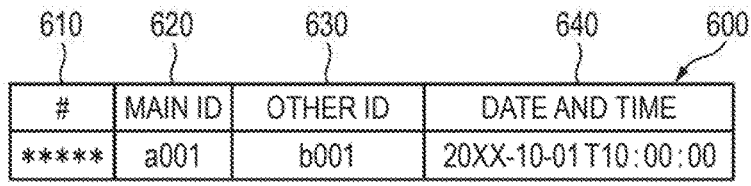
FIGS. 6A to 6D are explanatory diagrams illustrating a data structure of a device information table.

The device information DB 115 is connected to the device information storage module 110. The device information DB 115 stores information regarding the device 130 and the other device 160 that is located in the vicinity of the device 130 in association with each other. For example, a device information table 600 is stored. FIG. 6A is an explanatory diagram illustrating a data structure of the device information table 600. The device information table 600 has a # field 610, a main ID field 620, an other ID field 630, and a date and time field 640. The device information table 600 stores information indicating a relationship between the device 130 and the other device 160 at normal time. The # field 610 stores a code (such as a number) indicating the record in the device information table 600. The main ID field 620 stores information (main ID: IDentification) for uniquely identifying the device 130 in the present exemplary embodiment. The other ID field 630 stores information (other ID) for uniquely identifying the other device 160 in the present exemplary embodiment. It is an example of "information relating to other device 160." The date and time field 640 stores a date and a time (may be a year, a month, a date, an hour, a minute, a second, less than a second, or a combination of thereof) when the other device 160 transmits the other ID to the device 130. In addition, it may be a date and time when the device 130 receives the other ID from the other device 160, a date and time when the device 130 transmits a combination of the main ID and the other ID to the information processing apparatus 100, or a date and time when the information processing apparatus 100 receives the combination of the main ID and the other ID from the device 130.

The authentication module 105 is connected to the device information storage module 110, and is connected to a authentication request module 145 of the device 130 through the communication line 199. The authentication module 105 receives information about the other device 160 located in the vicinity of the device 130 at the time of authentication request, in response to that there is an authentication request from the device 130. As an aspect of this reception, the "information about the other device 160 located in the vicinity of the device 130" may be added to the authentication request.

The authentication module 105 authenticates the device 130, based on the information about the other device 160 that is stored in the device information DB 115 and the information about the other device 160 that the authentication module 105 receives from the device 130 at the time of the authentication request.

Further, the authentication module 105 does not permit authentication, in a case where the information about the other device 160 that is stored in the device information DB 115 and the information about the other device 160 that the authentication module 105 receives from the device 130 are not associated.

Specifically, in a case where the information about the other device 160 that is received from the device 130 matches the information about the other device 160 that is stored in the device information DB 115, authentication is successful. In a case where the information about the other device 160 that is received from the device 130 is not stored in the device information DB 115, authentication is unsuccessful (authentication is not permitted).

In addition, the authentication module 105 may perform authentication by using only the information about the other device 160, but may perform authentication by adding the information about the other device 160 to a user ID, a password, and the like which are commonly used.

In addition, the authentication module 105 may determine an invalid authentication request from the statistical probability in the authentication. For example, since the device 130 is not necessarily always be able to communicate with the same other device 160, in a case where there are plural other devices 160, if the information about the other device 160 that is received from the device 130 and the information about the other device 160 that is stored in the device information DB 115 match at a ratio greater than or equal to or greater than a predetermined ratio, authentication may be successful.

The device information storage module 110 is connected to the authentication module 105 and the device information DB 115, and is connected to a device information transmitting module 140 of the device 130 through the communication line 199. The device information storage module 110 stores the information about the other device 160 that is transmitted from the device 130, in the device information DB 115.

Further, the device information storage module 110 may store the information about the other device 160 when the device 130 permits authentication, in the device information DB 115 (A). In other words, the information about the other device 160 that is stored in the device information DB 115 is the information about the other device 160 when the device 130 permits authentication. In particular, this may be applied in a case where the other device 160 is a device which is portable and able to perform wireless communication.

Further, after successful authentication of the device 130 by the authentication module 105, the device information storage module 110 may store the information about the other device 160 that is transmitted at regular intervals by the device 130, in the device information DB 115 (B). In other words, after successful authentication of the device 130, the information about the other device 160 stored in the device information DB 115 is transmitted at regular intervals by the device 130. In particular, this may be applied in a case where the other device 160 is a device which is portable and able to perform wireless communication.

Further, in these cases ((A), (B)), the authentication module 105 may be configured not to permit authentication, in a case where the information about the other device 160 stored in the device information DB 115 and the information about the other device 160 that the authentication module 105 receives from the device 130 are not associated.

The device information storage module 110 may be configured to store information about the other device 160 provided in an area, registered in advance, for which the use of the device 130 is permitted, in the device information DB 115 (C). In other words, the information about the other device 160 stored in the device information DB 115 is information about the other device 160 provided in an area, registered in advance, for which the use of the device 130 is permitted. In addition, the area is registered in advance. In particular, this may be applied in a case where the other device 160 usually does not move and is able to perform wireless communication.

In addition, in the case ((C)), the authentication module 105 may be configured not to permit authentication, in a case where the information about the other device 160 stored in the device information DB 115 and the information about the other device 160 that the authentication module 105 receives from the device 130 are not associated.

The device 130 includes an information receiving module 135, the device information transmitting module 140, and the authentication request module 145.

The information receiving module 135 is connected to the device information transmitting module 140, and is connected to the information transmitting module 165 of the other device 160 through the communication line 198. The information receiving module 135 receives information (for example, the afore-mentioned other ID, or the like) about the other device 160 from the other device 160.

The device information transmitting module 140 is connected to the information receiving module 135, and is connected to the device information storage module 110 of the information processing apparatus 100 through the communication line 199. The device information transmitting module 140 transmits the information about the other device 160 that is received by the information receiving module 135, to the information processing apparatus 100.

The authentication request module 145 is connected to the authentication module 105 of the information processing apparatus 100 through the communication line 199. The authentication request module 145 transmits the authentication request of the device 130, to the information processing apparatus 100. In this case, information about the other device 160 that is capable of communicating at that point is transmitted.

The other device 160 includes an information transmitting module 165.

The information transmitting module 165 is connected to the information receiving module 135 of the device 130 through the communication line 198. The information transmitting module 165 transmits the information (for example, the afore-mentioned other ID, or the like) about the other device 160, to the authentication evaluating system 150. For example, information about the other device 160 may be broadcasted to a other device (including the device 130). Since the afore-mentioned communication is performed, a device located in the vicinity (for example, the device 130) receives information about the other device 160 (may be plural devices).

Figure 2:
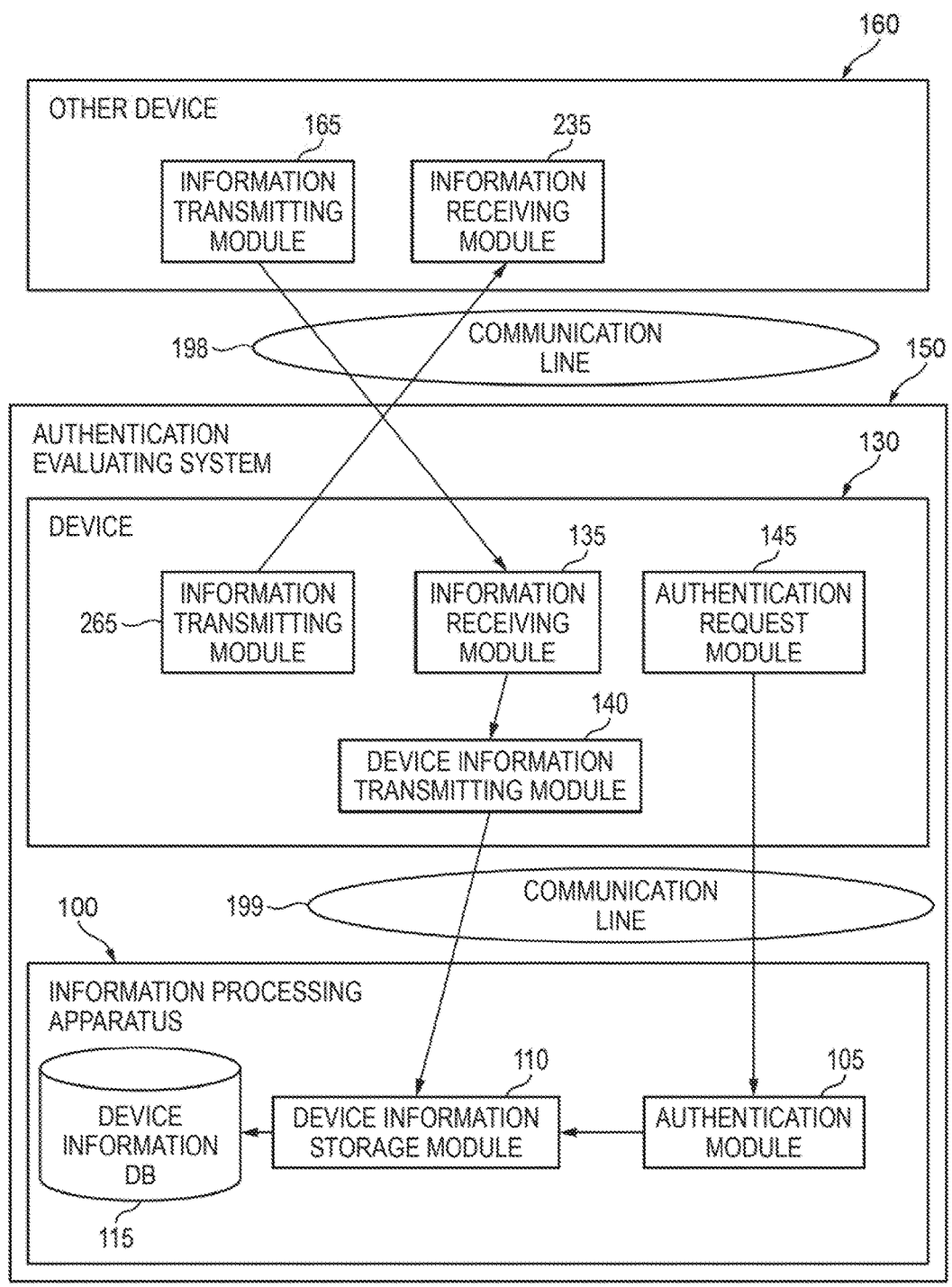
FIG. 2 is a conceptual module configuration diagram for a configuration example of the first exemplary embodiment.

FIG. 2 is a conceptual module configuration diagram for a configuration example of the first exemplary embodiment.

The information processing apparatus 100 includes an authentication module 105, a device information storage module 110, and a device information DB 115. The device 130 includes an information receiving module 135, a device information transmitting module 140, an authentication request module 145, and an information transmitting module 265. The other device 160 includes an information transmitting module 165, and an information receiving module 235. If compared with the module configuration illustrated in the example of FIG. 1, the information receiving module 235 is added in the other device 160, and the information transmitting module 265 is added in the device 130. In other words, it is indicated that the device 130 can also be the other device 160, and the other device 160 can also be the device 130. In the following description of the exemplary embodiment, a description is made in the form presented in the example of FIG. 2, but each exemplary embodiment may be the form presented in the example of FIG. 1.

The authentication module 105 is connected to the device information storage module 110, and is connected to a authentication request module 145 of the device 130 through the communication line 199.

The device information storage module 110 is connected to the authentication module 105 and the device information DB 115, and is connected to a device information transmitting module 140 of the device 130 through the communication line 199.

The device information DB 115 is connected to the device information storage module 110.

The information receiving module 135 is connected to the device information transmitting module 140, and is connected to the information transmitting module 165 of the other device 160 through the communication line 198.

The device information transmitting module 140 is connected to the information receiving module 135, and is connected to the device information storage module 110 of the information processing apparatus 100 through the communication line 199.

The authentication request module 145 is connected to the authentication module 105 of the information processing apparatus 100 through the communication line 199.

The information transmitting module 265 is connected to the information receiving module 235 of the other device 160 through the communication line 198. The information transmitting module 265 transmits information about the device 130 (for example, the ID or the like of the device 130) to the authentication evaluating system 150. In other words, the information transmitting module 265 has the same function as that of the information transmitting module 165.

The information transmitting module 165 is connected to the information receiving module 135 of the device 130 through the communication line 198.

The information receiving module 235 is connected to the information transmitting module 265 of the device 130 through the communication line 198. The information receiving module 235 receives the information about the device 130 (for example, the ID or the like of the device 130) from the device 130. In other words, the information receiving module 235 has the same function as that of the information receiving module 135.

Figure 3:
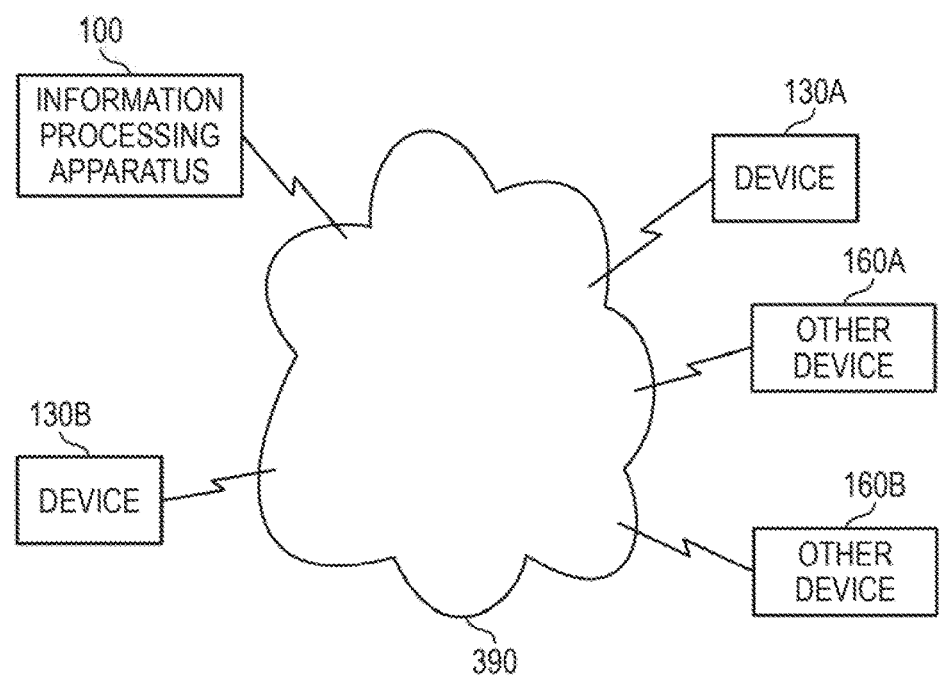
FIG. 3 is an explanatory diagram illustrating a system configuration example utilizing the present exemplary embodiments.

FIG. 3 is an explanatory diagram illustrating a system configuration example utilizing the present exemplary embodiment.

The information processing apparatus 100, a device 130A, a device 130B, an other device 160A, and an other device 160B are connected to each other, through a communication line 390, respectively. The communication line 390 may be wireless, a wired line, or a combination thereof, and, for example, may be the Internet, an intranet or the like, as a communication infrastructure. The communication between the device 130 and the other device 160 is, for example, short range wireless communication, or communication connected with a cable of a length which is less than or equal to or less than a predetermined cable length. Further, the functions by the information processing apparatus 100 may be implemented as a cloud service.

FIGS. 4A and 4B are explanatory diagrams illustrating an example of a process according to the first exemplary embodiment.

In the example of FIG. 4A, there are a other device 160A, a other device 160B, and a other device 160C in the vicinity of the device 130 that is an authentication target. The other device 160A is, for example, a wireless AP (SSID). The other device 160B is, for example, a notebook PC of a colleague. The other device 160C is, for example, a mobile router. In this way, the device 130 is surrounded by other devices (160A, 160B, and 160C) such as a wireless AP, other wireless connection PCs and the like at a workplace. Since the device 130 receives the IDs (the afore-mentioned other IDs, or the like) and transmits the IDs to the information processing apparatus 100, the information processing apparatus 100 adds the IDs in the device information table 600. In order to make an authentication request, IDs are acquired from the other device 160A, the other device 160B, and the other device 160C, which are capable of performing wireless communication, and are transmitted to the information processing apparatus 100, and the information processing apparatus 100 makes an inquiry, and thus confirm that the other devices are in a work place (authentication success).

The example in FIG. 4B illustrates a case where the device 130 is stolen. Since there are not other devices (the other device 160A, the other device 160B, and the other device 160C) which are present in the vicinity of the device 130 at the normal time, the device 130 is not able to transmit the IDs to the information processing apparatus 100. The occurrence of a different situation (stolen situation or the like) from the normal time may be inferred from that. In this case, the information processing apparatus 100 does not permit the authentication of the device 130.

Figure 5:
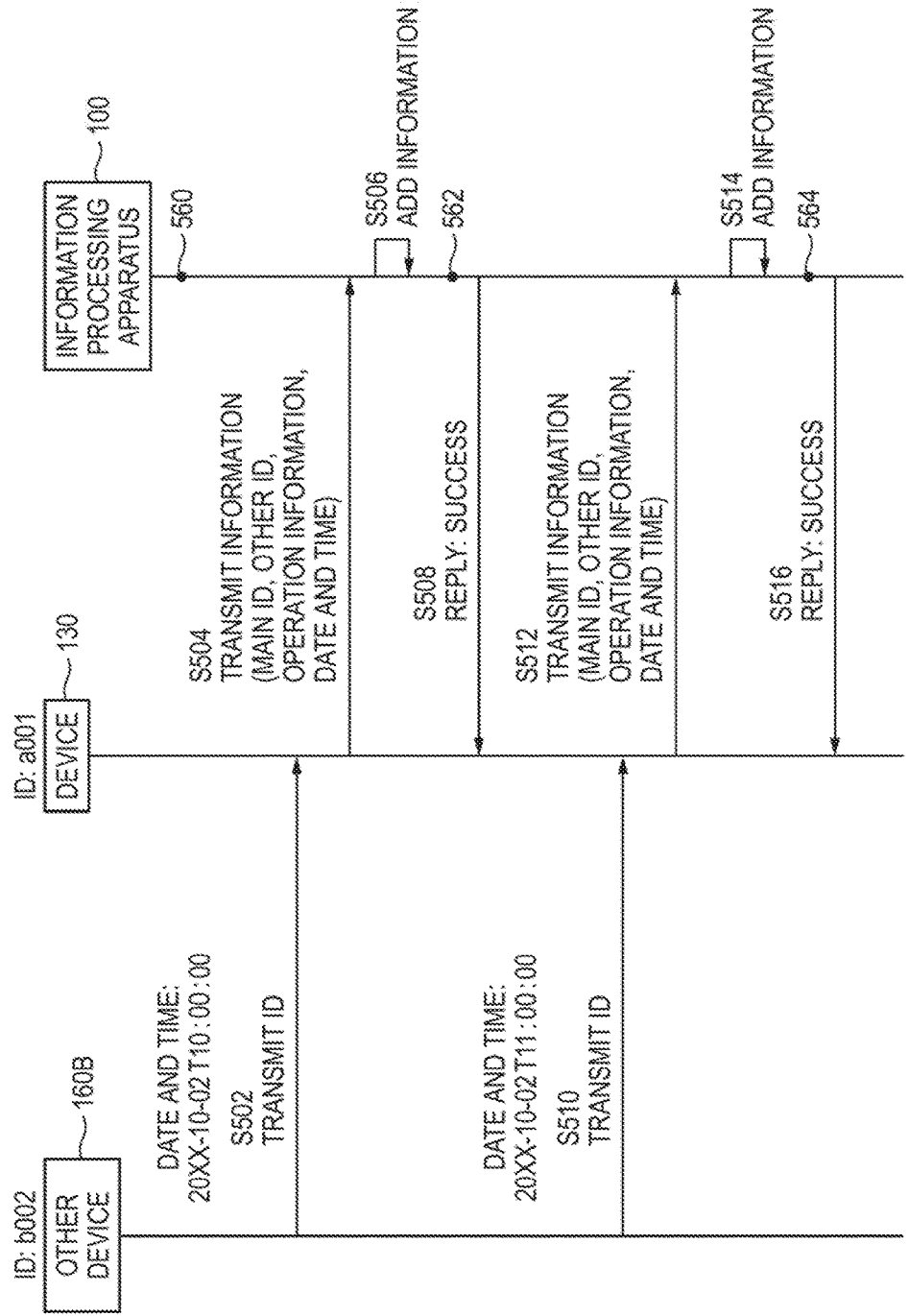
FIG. 5 is a flow chart illustrating an example of a process according to the first exemplary embodiment.

FIG. 5 is a flow chart illustrating an example of a process according to the first exemplary embodiment. An example of a process of storing the information about the other device 160 and the information about the device 130 at the normal time in the device information DB 115 is illustrated.

For example, in a case where the other device 160 enters the radio range of the wireless communication base station that is operated by the device 130, the device 130 acquires the ID of the other device 160, transmits the ID to the information processing apparatus 100, and the information processing apparatus 100 stores the ID in the device information DB 115. For example, this process may be performed when the authentication for the device 130 is permitted, or may be performed every predetermined period of time (periodically) after successful authentication of the device 130. Further, the information including the other device 160 provided in an area, registered in advance, for which the use of the device 130 is permitted may be registered.

At the time 560, the device information table 600 in the device information DB 115 is in a state illustrated in the example of FIG. 6A.

In step S502, the other device 160B transmits the ID (b002) to the device 130. At this time, the transmission date and time: 20XX-10-02T10:00:00 is given. It should be noted that this date and time may be determined in advance, or may be the time when communication becomes available between the device 130 and the other device 160B.

In step S504, the device 130 transmits information (the main ID, the other ID, and date and time) to the information processing apparatus 100. The main ID is the ID of the device 130, and the other ID is the ID of the other device 160B. The date and time may be date and time when the other device 160B transmits.

In step S506, the device information storage module 110 adds the received information in the device information DB 115.

Figure 6B:
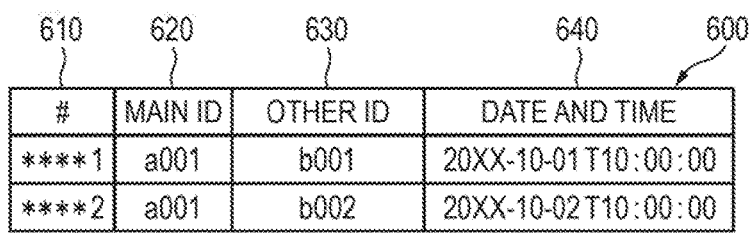

At the time 562, the device information table 600 in the device information DB 115 is in a state indicated in the example of FIG. 6B. In other words, one record is increased.

In step S508, the information processing apparatus 100 sends a reply of success to the device 130.

In step S510, the other device 160B transmits the ID (b002) to the device 130, at the date and time of 20XX-10-02T11:00:00. The timing of performing this process is, for example, timing when a predetermined period of time elapses from the process of step S502.

In step S512, the device 130 transmits information (the main ID, the other ID, and date and time) to the information processing apparatus 100.

In step S514, the device information storage module 110 adds the received information in the device information DB 115.

Figure 6C:
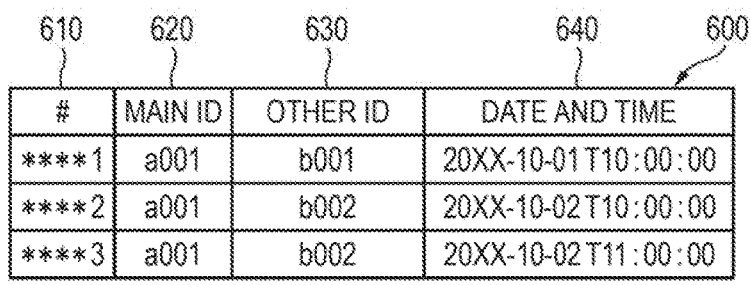
Figure 6D:
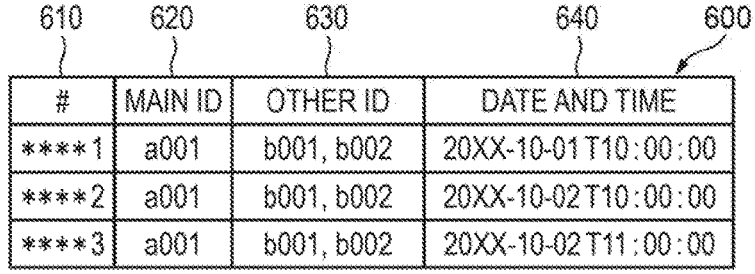

At the time 564, the device information table 600 in the device information DB 115 is in a state indicated in the example of FIG. 6C. In other words, one record is further increased. In addition, the other ID in the other ID field 630 of the device information table 600 is a list, and in a case where there are plural "other devices" (b001, b002), as illustrated in the example of FIG. 6D, it is data of a list format.

In step S516, the information processing apparatus 100 sends a reply of success to the device 130.

Figure 7:
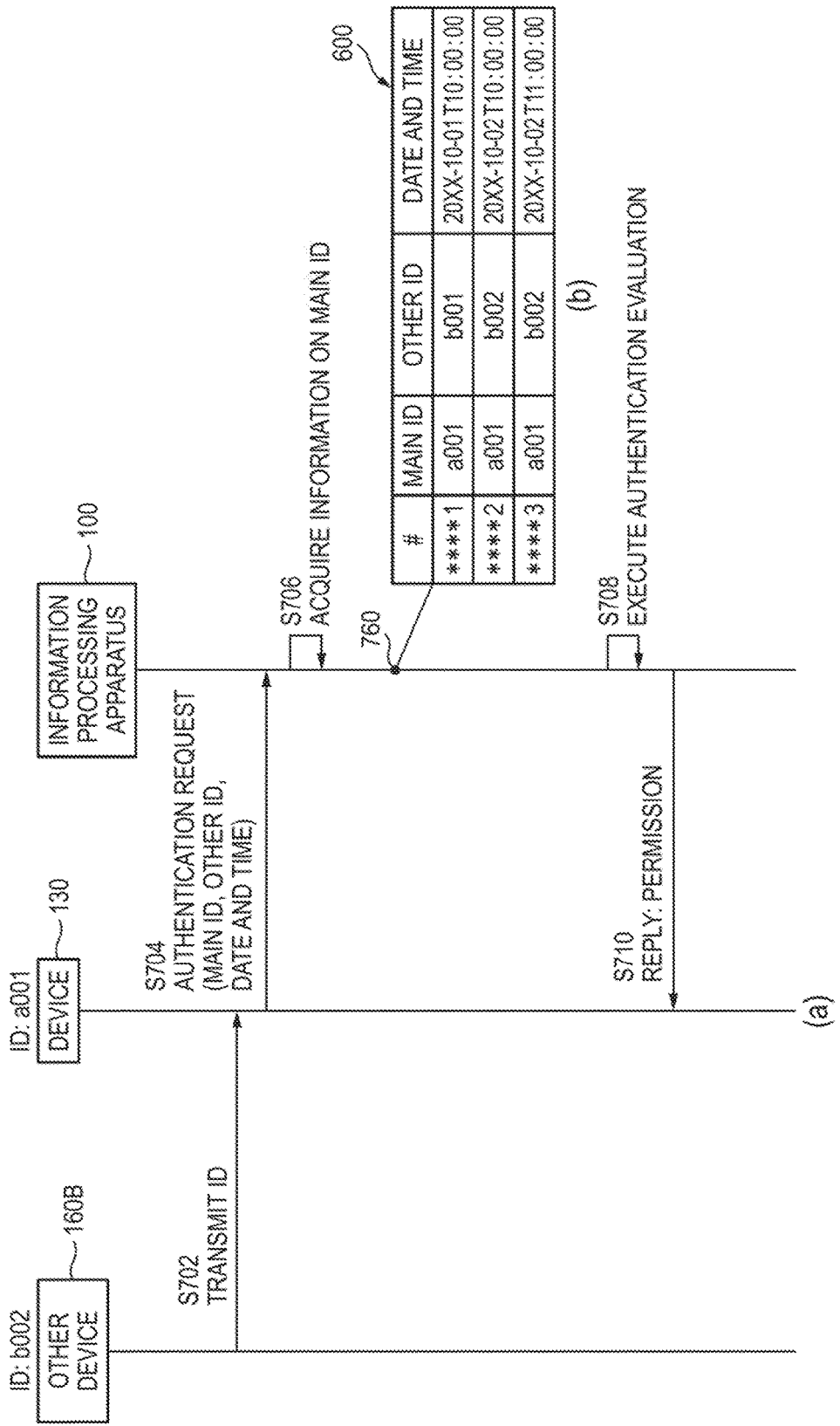
FIG. 7 is a flow chart illustrating an example of a process according to the first exemplary embodiment.

FIG. 7 is a flow chart illustrating an example of a process according to the first exemplary embodiment. An example of authentication evaluation at the normal time is illustrated.

In step S702, the other device 160B transmits the ID (b002) to the device 130.

In step S704, the device 130 makes an authentication request (the main ID, the other ID, and date and time) to the information processing apparatus 100. Here, the date and time is transmission date and time.

In step S706, the information processing apparatus 100 acquires information on the main ID in the device information table 600.

The device information table 600 at the time 760 is, for example, as illustrated in (b) of FIG. 7.

In step S708, the information processing apparatus 100 executes authentication evaluation. In other words, the number of occurrences of "b002" in the device information table 600 is checked. Specifically, the other ID: b002 received in step S704 is permitted because the number of occurrences thereof in the device information table 600 is "2". It should be noted that the number of occurrences in the device information table 600 is greater than a predetermined number of times (for example, 1 or the like), or greater than or more than the predetermined number of times may be a condition for permission. While of course, in the case of using the data structure of the device information table 600, on condition that the main ID (the ID of the device 130 that makes the authentication request) is "a001", the number of occurrences is counted.

Further, the number of occurrences is sorted in a descending order, and presence within a predetermined order (from the top to the predetermined order) may be a condition for permission.

Further, in a case where there are plural other IDs of the other device 160 that are received at the time of the authentication request, estimation may be performed for each other ID (a process of determining permission or non-permission for each other ID is performed), overall final conclusion may be performed from the logical operation result of each of the evaluation results. Further, the logical operation expression used in the logic operation may be designated in advance.

In step S710, the information processing apparatus 100 sends a reply of permission to the device 130.

Figure 8:
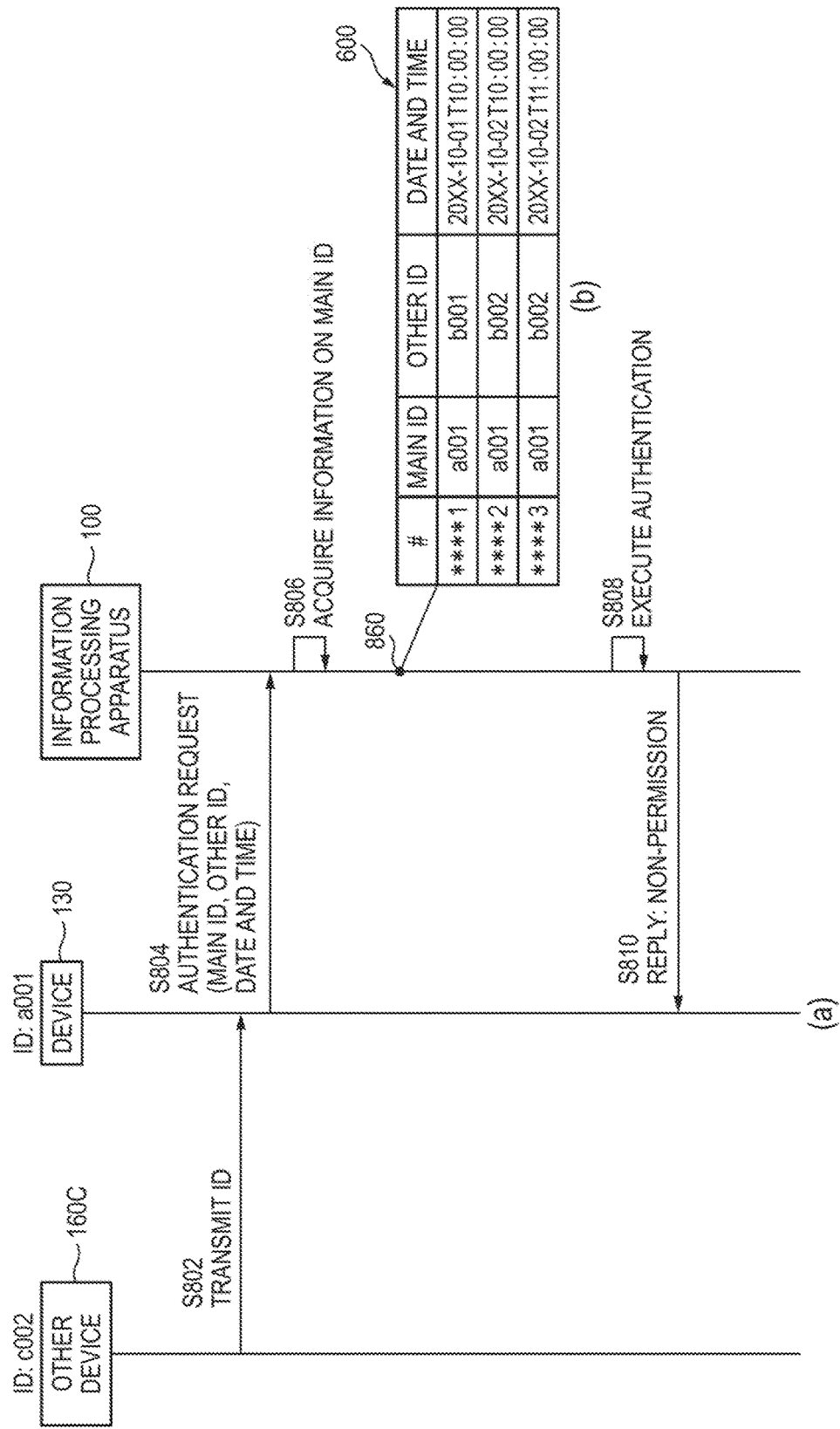
FIG. 8 is a flow chart illustrating an example of a process according to the first exemplary embodiment.

FIG. 8 is a flow chart illustrating an example of a process according to the first exemplary embodiment. An example of authentication evaluation at the time of abnormality is illustrated. For example, it is the case where the device 130 is stolen.

In step S802, the other device 160C transmits the ID (c002) to the device 130.

In step S804, the device 130 makes an authentication request (the main ID, the other ID, and date and time) to the information processing apparatus 100.

In step S806, the information processing apparatus 100 acquires information on the main ID in the device information table 600.

The device information table 600 at the time 860 is, for example, as illustrated in (b) of FIG. 8.

In step S808, the information processing apparatus 100 performs authentication. In other words, the number of occurrences of "c002" in the device information table 600 is checked. Specifically, the other ID: c002 received in step S804 is not permitted because the number of occurrences thereof in the device information table 600 is "0".

In step S810, the information processing apparatus 100 sends a reply of non-permission to the device 130.

Second Exemplary Embodiment

Figure 9:
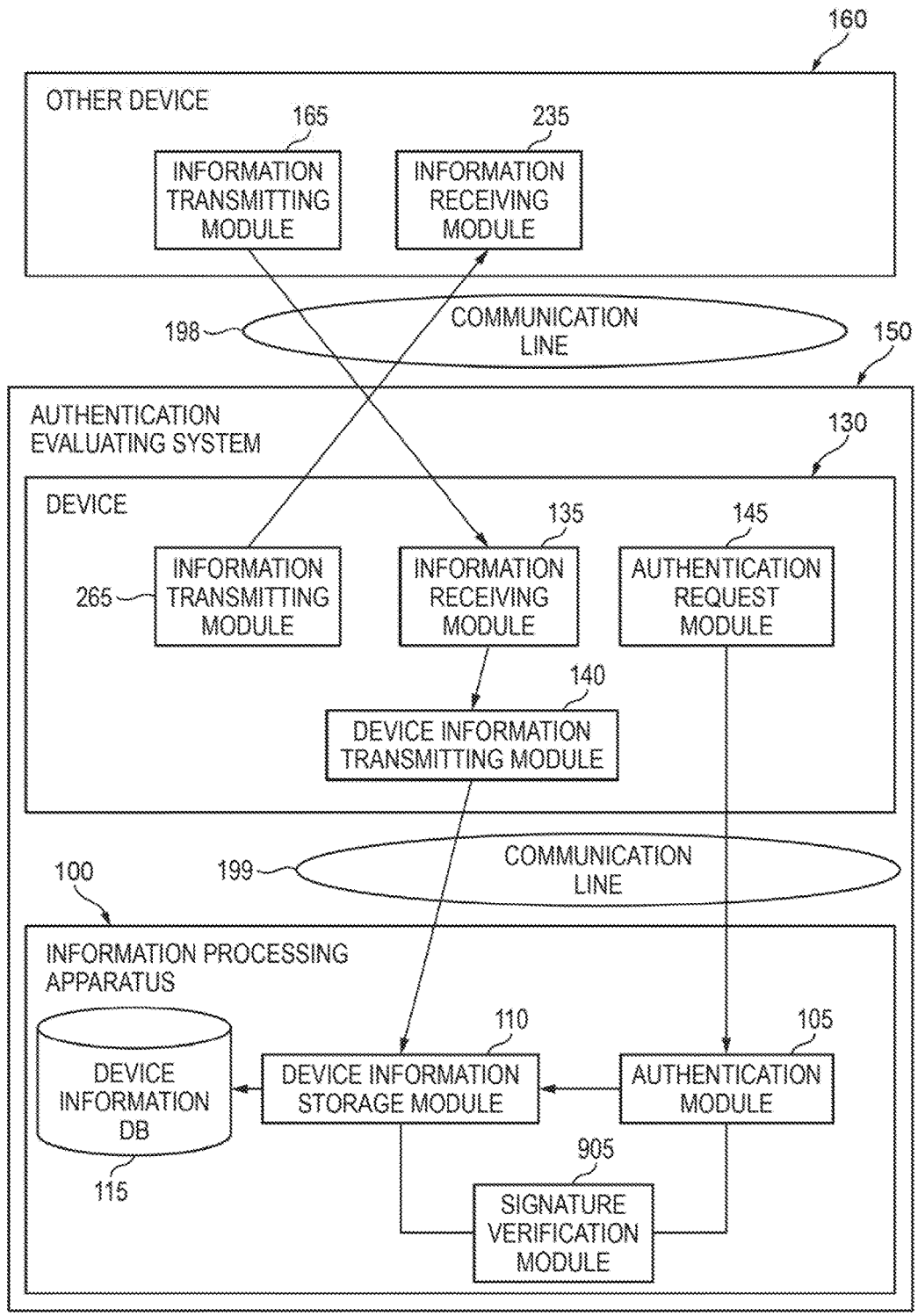
FIG. 9 is a conceptual module configuration diagram for a configuration example of a second exemplary embodiment.

FIG. 9 is a conceptual module configuration diagram for a configuration example of a second exemplary embodiment.

The information processing apparatus 100 includes an authentication module 105, a signature verification module 905, a device information storage module 110, and a device information DB 115.

The device 130 includes an information receiving module 135, a device information transmitting module 140, an authentication request module 145, and an information transmitting module 265.

The other device 160 includes an information transmitting module 165, and an information receiving module 235. If compared with the module configuration illustrated in the example of FIG. 2, the signature verification module 905 is added to the information processing apparatus 100.

The information transmitting module 165 is connected to the information receiving module 135 of the device 130 through the communication line 198. The information transmitting module 165 gives an electronic signature to information about the other device 160. It is intended to be able to verify the forgery of the information to be transmitted. For example, it may be an existing encryption system such as AES.

The information receiving module 235 is connected to the information transmitting module 265 of the device 130 through the communication line 198.

The information receiving module 135 is connected to the device information transmitting module 140, and is connected to the information transmitting module 165 of the other device 160 through the communication line 198.

The device information transmitting module 140 is connected to the information receiving module 135, and is connected to the device information storage module 110 of the information processing apparatus 100 through the communication line 199.

The authentication request module 145 is connected to the authentication module 105 of the information processing apparatus 100 through the communication line 199.

The information transmitting module 265 is connected to the information receiving module 235 of the other device 160 through the communication line 198. The information transmitting module 265 has the same function as that of the afore-mentioned information transmitting module 165.

The authentication module 105 is connected to the device information storage module 110 and the signature verification module 905, and is connected to the authentication request module 145 of the device 130 through the communication line 199.

The device information storage module 110 is connected to the authentication module 105, the signature verification module 905, and the device information DB 115, and is connected to the device information transmitting module 140 of the device 130 through the communication line 199.

The device information DB 115 is connected to the device information storage module 110.

The signature verification module 905 is connected to the authentication module 105 and the device information storage module 110. The signature verification module 905 verifies the electronic signature that is assigned to the information transmitted by the other device 160. This is intended to allow verifying the forgery of information originated by the other device 160. It should be noted that a public key may be saved in advance in the information processing apparatus 100. For example, the manufacturer which produces the other device 160 (the device 130) may register the public key in advance in the information processing apparatus 100, through the authentication authority. Alternatively, a public key certificate, which is signed in the intermediate certificate issued by the authentication authority, may be used.

Specifically, the signature verification module 905 verifies the signature for the information about the other device 160 that is transmitted from the device 130 before adding in the device information DB 115. It is possible to outsource the signature verification to an external service, in addition to a method of saving the public key in the device information DB 115 and sequentially reading it for use.

Figure 10:
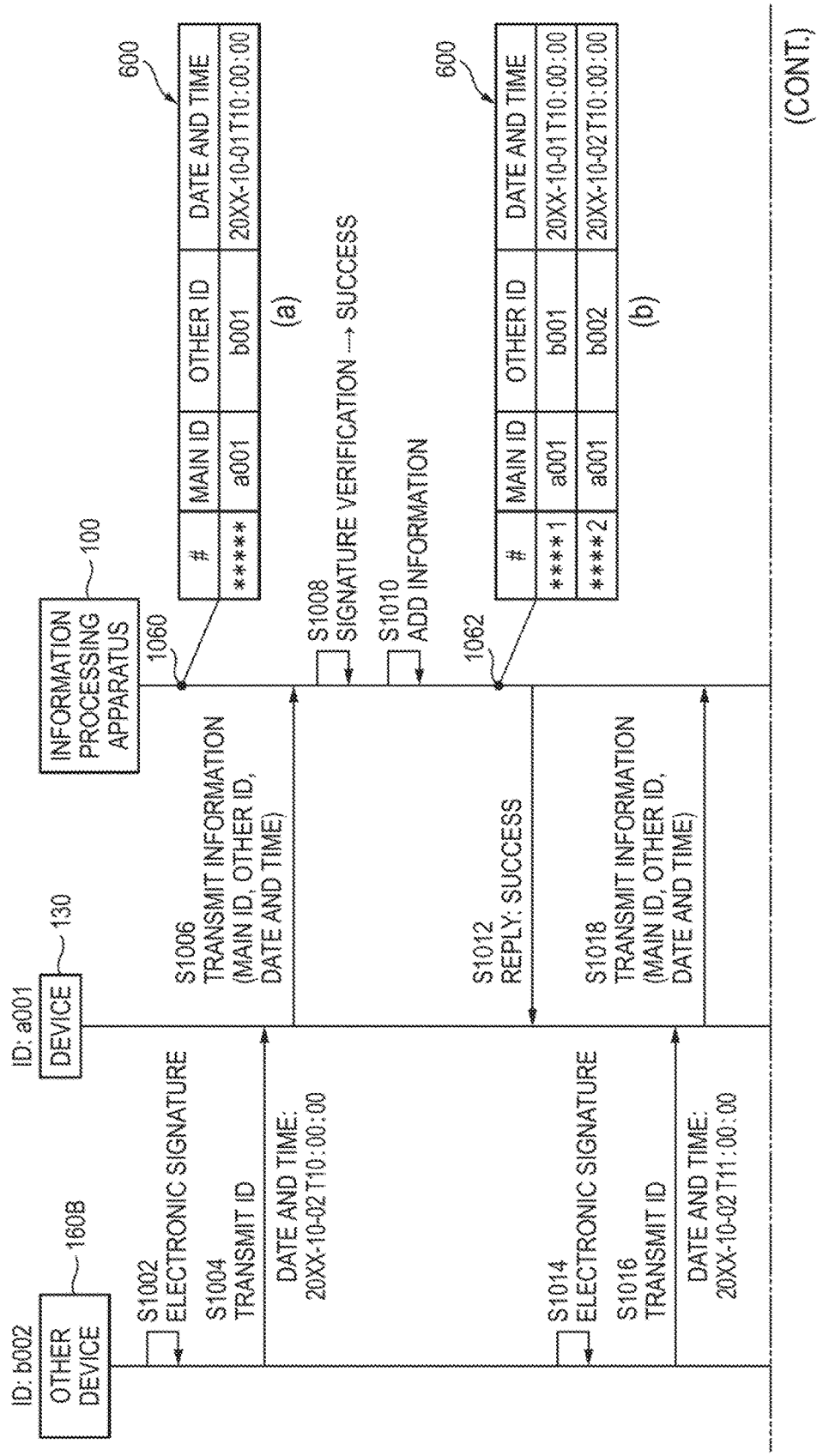
FIG. 10 is a flow chart illustrating an example of a process according to the second exemplary embodiment.

FIG. 10 is a flow chart illustrating an example of a process according to the second exemplary embodiment. An example of a process of storing the information about the other device 160 and the information about the device 130 at the normal time in the device information DB 115 is illustrated. FIG. 10 is obtained by adding step S1002, step S1008, step S1014, and step S1020 in the flow chart illustrated in FIG. 5.

The device information table 600 at the time 1060 is, for example, as illustrated in (a) of FIG. 10.

In step S1002, the other device 160B performs an electronic signature for the ID (other ID).

In step S1004, the other device 160B transmits the ID (b002) to the device 130, at the date and time of 20XX-10-02T10:00:00.

In step S1006, the device 130 transmits information (the main ID, the other ID, and date and time) to the information processing apparatus 100. Here, electronic signature is applied to the other ID.

In step S1008, the information processing apparatus 100 verifies the electronic signature of the other ID. Here, verification is successful.

In step S1010, the device information storage module 110 adds the verified information in the device information DB 115.

The device information table 600 at the time 1062 is, for example, as illustrated in (b) of FIG. 10.

In step S1012, the information processing apparatus 100 sends a reply of success to the device 130.

In step S1014, the other device 160B performs an electronic signature for the ID (other ID).

In step S1016, the other device 160B transmits the ID (b002) to the device 130, at the date and time of 20XX-10-02T11:00:00.

In step S1018, the device 130 transmits information (the main ID, the other ID, and date and time) to the information processing apparatus 100.

In step S1020, the information processing apparatus 100 verifies the electronic signature. Here, the verification is successful.

In step S1022, the device information storage module 110 adds the verified information in the device information DB 115.

The device information table 600 at the time 1064 is, for example, as illustrated in (c) of FIG. 10. In addition, as described above, the device information table 600 (other ID field 630) in (c) of FIG. 10 may be used as the data of the list format as illustrated in the example of (d) of FIG. 10.

In step S1024, the information processing apparatus 100 sends a reply of success to the device 130.

Figure 11:
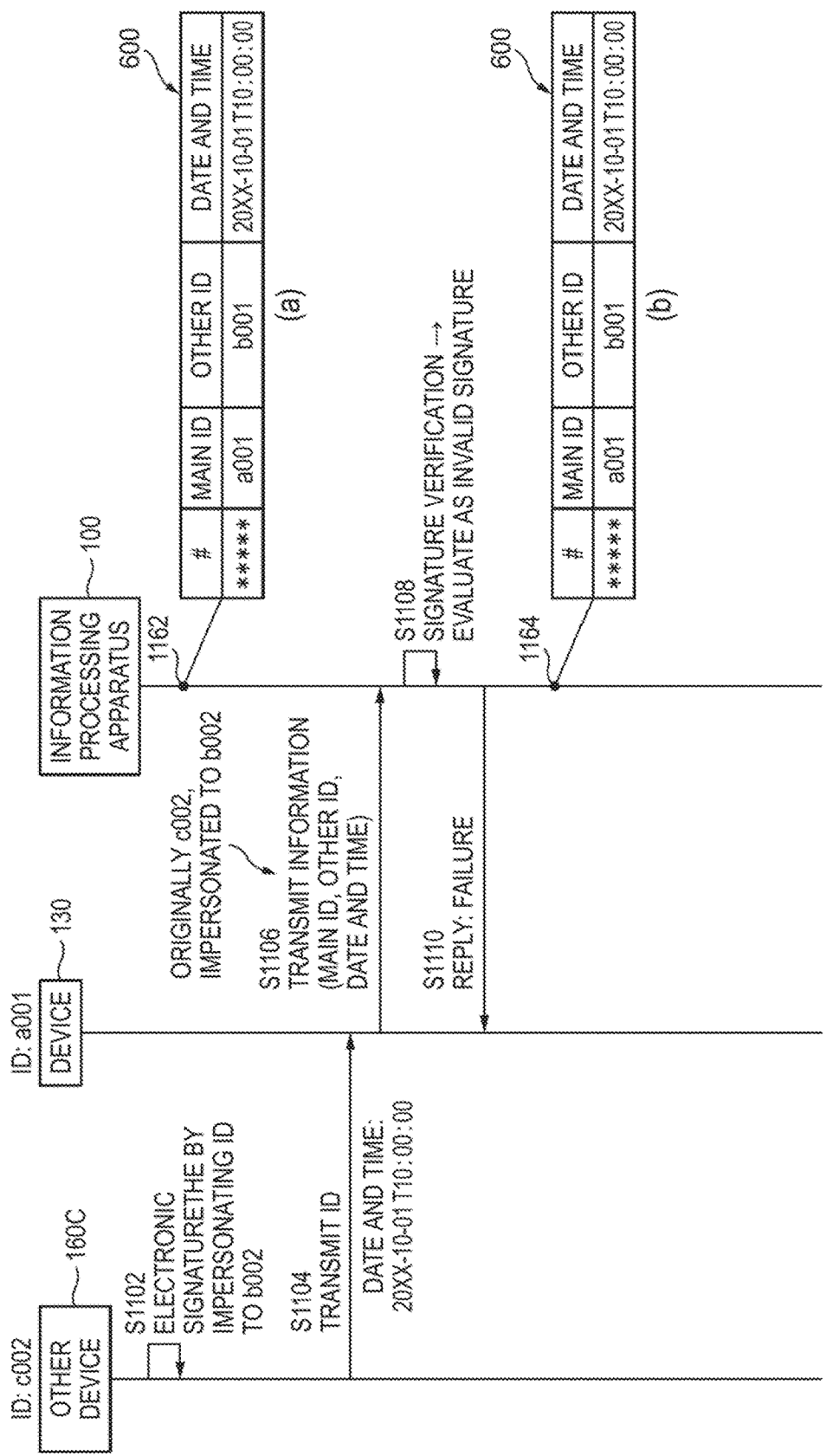
FIG. 11 is a flow chart illustrating an example of the process according to the second exemplary embodiment.

FIG. 11 is a flow chart illustrating an example of a process according to the second exemplary embodiment. An example of a process of storing the information about the other device 160 and the information about the device 130, in the device information DB 115 is illustrated, but it corresponds to the time of abnormality.

The device information table 600 at the time 1162 is, for example, as illustrated in (a) of FIG. 11.

In step S1102, the other device 160C performs an electronic signature by impersonating the ID of the other device 160C (other ID) to b002.

In step S1104, the other device 160C transmits the ID (b002) to the device 130, at the date and time of 20XX-10-02T10:00:00.

In step S1106, the device 130 transmits information (the main ID, the other ID, and date and time) to the information processing apparatus 100. The other ID is originally c002, but is impersonated to b002 herein.

In step S1108, the information processing apparatus 100 verifies the signature, and evaluates it as invalid signature. This is because the signature verification using the public key certificate of b002 is failed.

In step S1110, the information processing apparatus 100 sends a reply of failure to the device 130.

The device information table 600 at the time 1164 is, for example, as illustrated in (b) of FIG. 11. In other words, it is in the same state as in the device information table 600 illustrated in the example of (a) of FIG. 11.

Third Exemplary Embodiment

Figure 12:
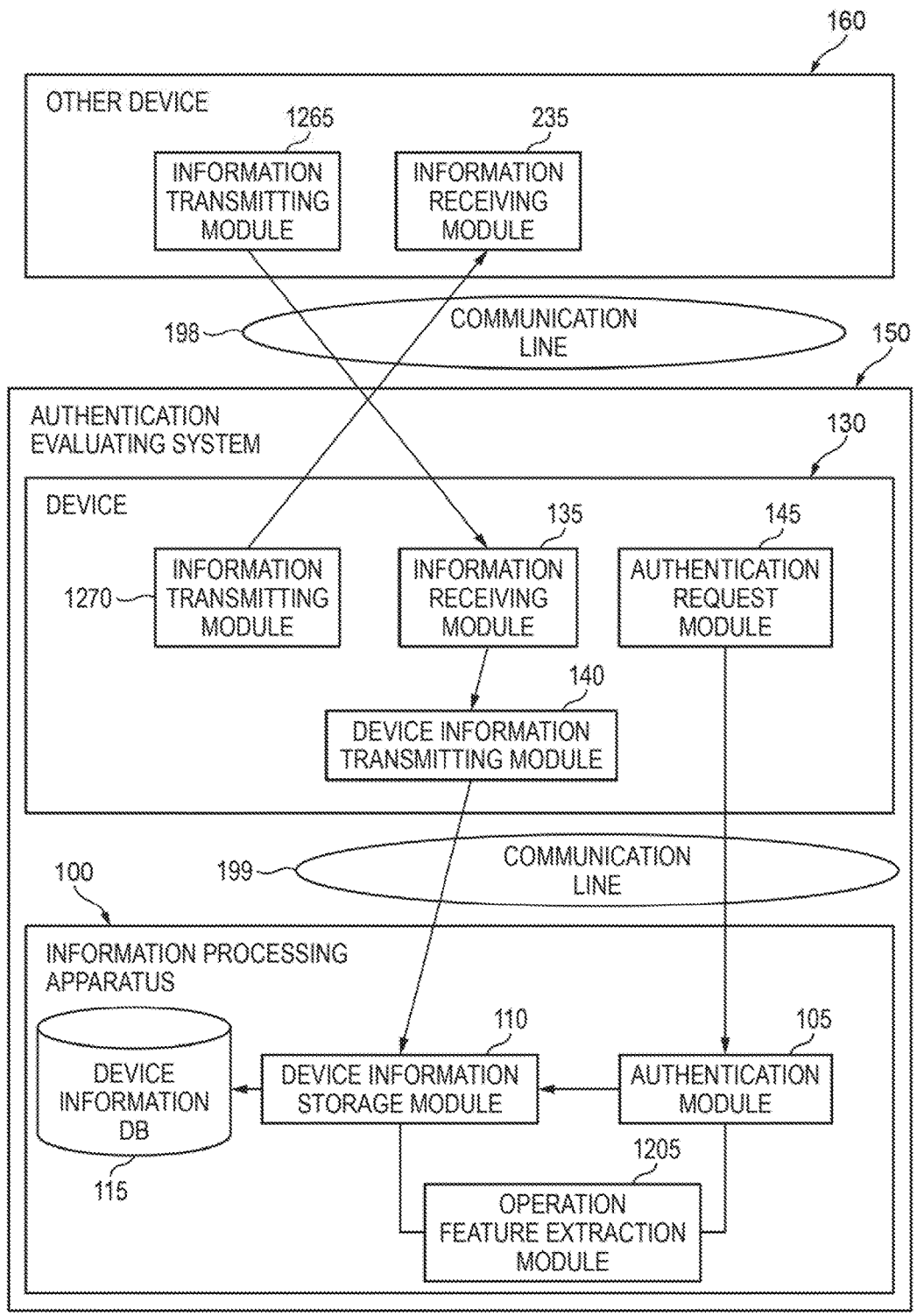
FIG. 12 is a conceptual module configuration diagram for a configuration example of a third exemplary embodiment.

FIG. 12 is a conceptual module configuration diagram for a configuration example of a third exemplary embodiment.

The information processing apparatus 100 includes the authentication module 105, an operation feature extraction module 1205, the device information storage module 110, and the device information DB 115.

The device 130 includes an information receiving module 135, the device information transmitting module 140, the authentication request module 145, and an information transmitting module 1270.

The other device 160 includes an information transmitting module 1265 and an information receiving module 235. If compared with the module configuration illustrated in the example of FIG. 2, the information transmitting module 165 of the other device 160 is the information transmitting module 1265, the information transmitting module 265 of the device 130 is the information transmitting module 1270, and the operation feature extraction module 1205 is added in the information processing apparatus 100. The "information about the other device" is exemplified as the device ID in the exemplary embodiment described above, but may include information indicating the operating status of the other device.

The information transmitting module 1265 is connected to the information receiving module 135 of the device 130 through the communication line 198. The information transmitting module 1265 transmits transmission information to the device 130, by including the operation information of the other device 160 in the transmission information. Examples of the operation information include the remaining charge amount of a battery, an operation record, the access log of a device OS, a security log, a sensor log, and the like.

The information receiving module 235 is connected to the information transmitting module 1270 of the device 130 through the communication line 198.

The information receiving module 135 is connected to the device information transmitting module 140, and is connected to the information transmitting module 1265 of the other device 160 through the communication line 198.

The device information transmitting module 140 is connected to the information receiving module 135, and is connected to the device information storage module 110 of the information processing apparatus 100 through the communication line 199.

The authentication request module 145 is connected to the authentication module 105 of the information processing apparatus 100 through the communication line 199.

The information transmitting module 1270 is connected to the information receiving module 235 of the other device 160 through the communication line 198. The information transmitting module 1270 has the same function as that of the afore-mentioned information transmitting module 1265.

The authentication module 105 is connected to the device information storage module 110 and the operation feature extraction module 1205, and is connected to the authentication request module 145 of the device 130 through the communication line 199.

The device information storage module 110 is connected to the authentication module 105, the operation feature extraction module 1205, and the device information DB 115, and is connected to the device information transmitting module 140 of the device 130 through the communication line 199.

Figure 14A:
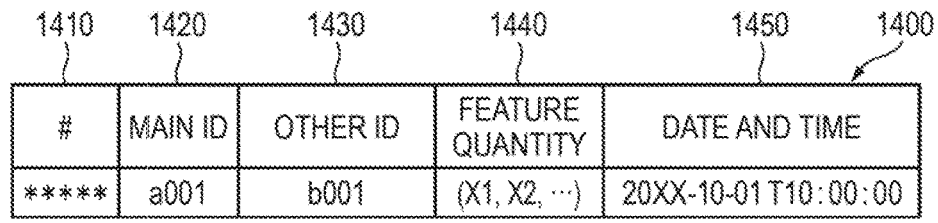
FIGS. 14A to 14C are explanatory diagrams illustrating an example of a data structure of a device information table.

The device information DB 115 is connected to the device information storage module 110. The device information DB 115 stores, for example, the device information table 1400. FIG. 14A is an explanatory diagram illustrating a data structure example of the device information table 1400. The device information table 1400 has a # field 1410, a main ID field 1420, a other ID field 1430, a feature quantity field 1440, a date and time field 1450. The device information table 1400 is obtained by adding the feature quantity field 1440 in the device information table 600 illustrated in the example of FIGS. 6A to 6D. The # field 1410 stores a code (number) indicating the record in the device information table 1400. The main ID field 1420 stores a main ID. The other ID field 1430 stores a other ID. The feature quantity field 1440 stores the feature quantity of the other device 160 indicated by the other ID. The date and time field 1450 stores date and time.

The operation feature extraction module 1205 is connected to the authentication module 105 and the device information storage module 110. The operation feature extraction module 1205 extracts a feature quantity from the operation information of the other device 160 that is transmitted up to that time. This allows to determine the possibility that not only the device 130 but also the other device 160 are stolen, from the operation information. For example, if the remaining charge amount of a mobile battery is 30% which is kept at 50% or more at the normal time and the operation of the smart watch is cut off which is operated at specific intervals at the normal time, the feature quantities are different from at the normal time, and the authentication is not permitted.

Figure 13:
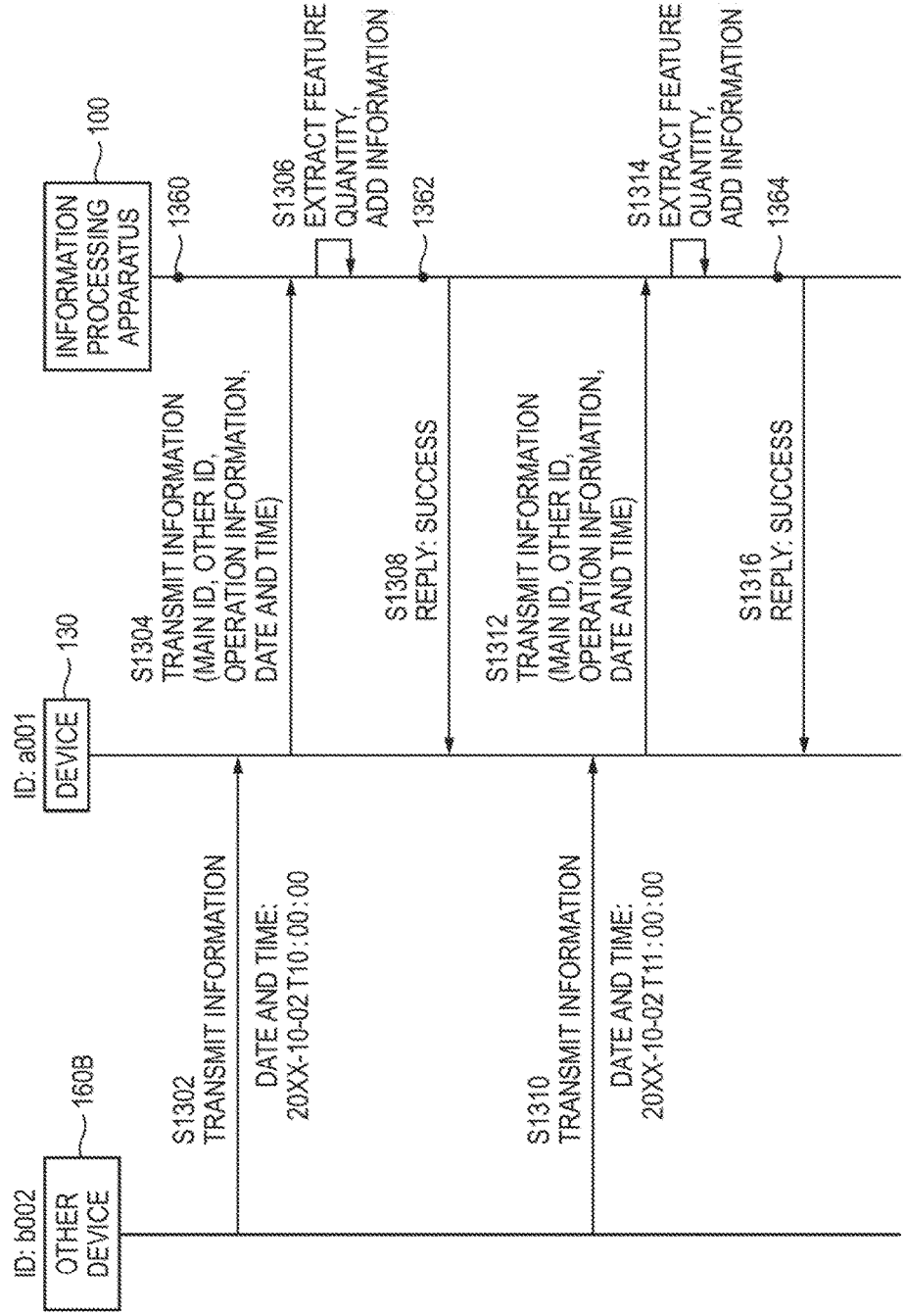
FIG. 13 is a flow chart illustrating an example of a process according to the third exemplary embodiment.

FIG. 13 is a flow chart illustrating an example of a process according to the third exemplary embodiment. An example of a process of storing the operation information on other device 160 and the information about the device 130 at the normal time in the device information DB 115 is illustrated.

The device information table 600 at the time 1360 is, for example, as illustrated in FIG. 14A.

In step S1302, the other device 160B transmits the operation information to the device 130, at the date and time of 20XX-10-02T10:00:00. The afore-mentioned operation information is also transmitted, for example, by being compressed.

In step S1304, the device 130 transmits the information (main ID, other ID, operation information, and date and time) to the information processing apparatus 100.

In step S1306, the information processing apparatus 100 extracts the feature quantity, and add information in the device information DB 115. Specifically, the operation feature extraction module 1205 extracts the most likelihood feature quantity in statistics such as the most frequently used period of time, the remaining amount of the battery, GPS, the slope of the device, and the brightness of the screen, from the transmitted operation information on the device. For example, the existing feature quantity extraction, the maximum likelihood estimation or the like is performed. Further, the feature quantity extraction expression at this time may be stored in the device information DB 115.

Figure 14B:
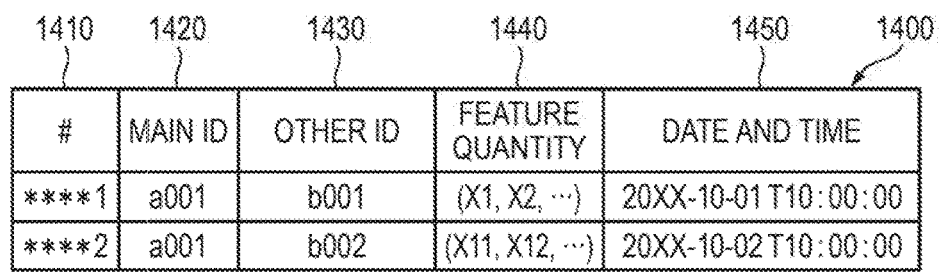

The device information table 600 at the time 1362 is, for example, as illustrated in FIG. 14B. In other words, one record is increased, from the state of the device information table 1400 (FIG. 14A) at the time 1360.

In step S1308, the information processing apparatus 100 sends a reply of success to the device 130.

In step S1310, the other device 160B transmits the operation information to the device 130, at the date and time of 20XX-10-02T11:00:00.

In step S1312, the device 130 transmits information (the main ID, the other ID, the operation information, and date and time) to the information processing apparatus 100. Here, the operation information is the operation information of the other device 160B.

In step S1314, the information processing apparatus 100 extracts the feature quantity, and adds the information in the device information DB 115.

Figure 14C:
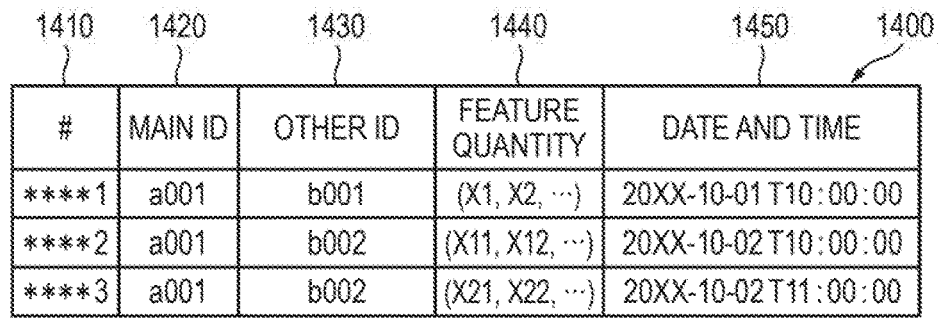

The device information table 600 at the time 1364 is, for example, as illustrated in FIG. 14C. In other words, one record is increased, from the state of the device information table 1400 (FIG. 14B) at the time 1362.

In step S1316, the information processing apparatus 100 sends a reply of success to the device 130.

FIG. 15 is a flow chart illustrating an example of a process according to the third exemplary embodiment. A processing example of authentication evaluation at normal time is illustrated.

In step S1502, the other device 160B transmits operation information to the device 130. For example, this information contains a fact that the battery level is 80%. It is assumed that the battery level of more than 50% is usually kept. The feature quantity of the operation information is stored in the feature quantity field 1440 of the device information table 1400.

In step S1504, the device 130 makes an authentication request (main ID, other ID, operation information, and date and time) to the information processing apparatus 100. Here, the operation information is the operation information of the other device 160B.

In step S1506, the information processing apparatus 100 acquires the information on the main ID in the device information DB 115.

The device information table 1400 at the time 1560 is, for example, as illustrated in (b) of FIG. 15.

In step S1508, the information processing apparatus 100 performs authentication evaluation. The number of occurrences in the device information table 1400 is checked, and the number of occurrences of the other ID: b002 is "2".

In step S1510, the information processing apparatus 100 performs the authentication evaluation. The feature quantity in the device information table 1400 is checked, and it is determined that there is no change in the operation information in the other ID: b002. The feature quantity is extracted from the operation information on the other device 160B at the authentication request time, by using the feature quantity extraction expression, the extracted feature quantity is compared with the feature quantity at the normal time, and for example, if the Mahalanobis' distance is less than or equal to or less than a predetermined threshold, the authentication result is permitted. In this example, since the battery level is 50% or more, the authentication result is permitted.

In step S1512, the information processing apparatus 100 sends a reply of permission to the device 130.

Figure 16:
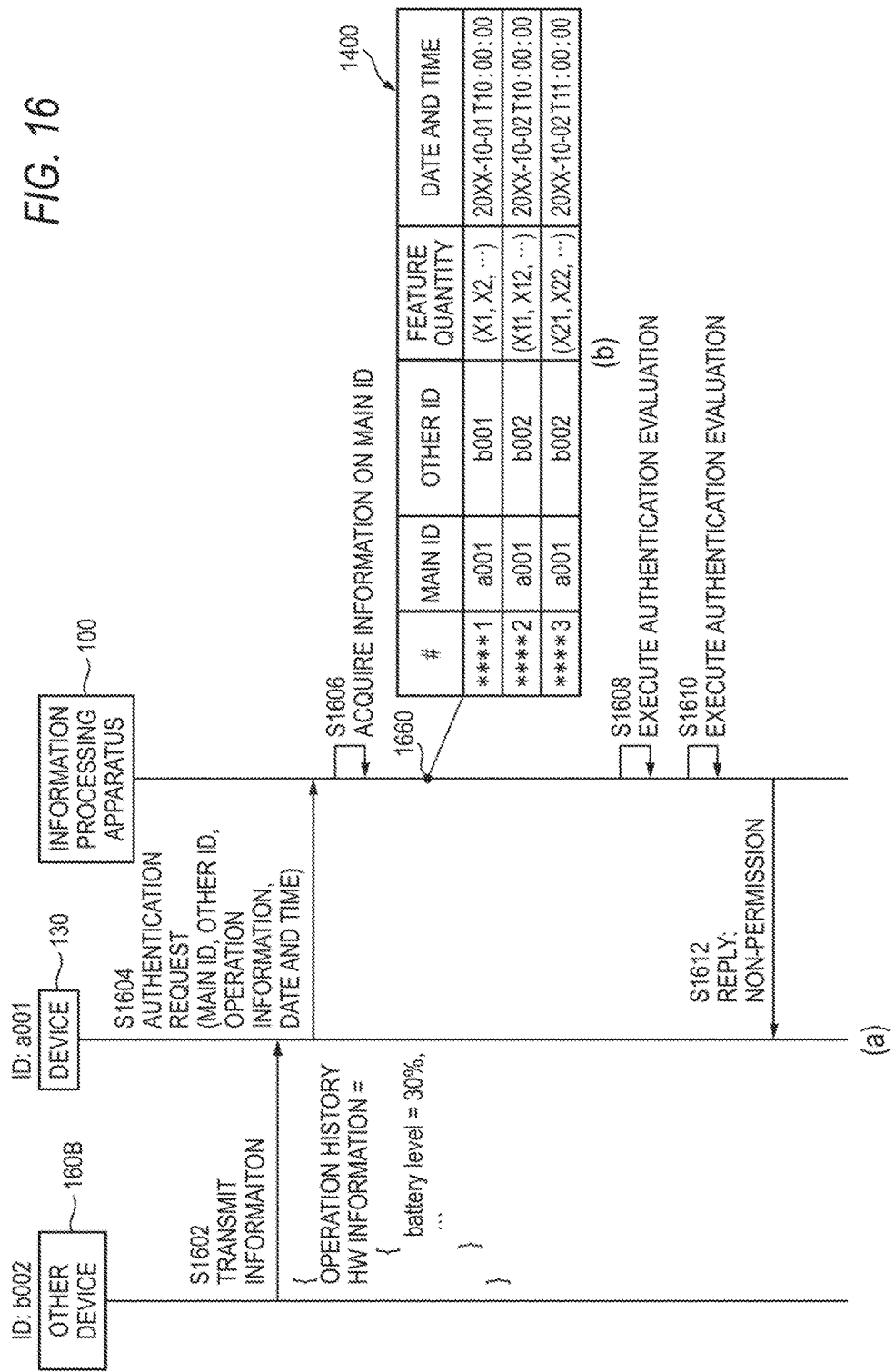
FIG. 16 is a flow chart illustrating an example of a process according to the third exemplary embodiment.

FIG. 16 is a flow chart illustrating an example of a process according to the third exemplary embodiment. A processing example of authentication evaluation at the time of abnormality is illustrated.

In step S1602, the other device 160B transmits the operation information to the device 130. For example, this information contains a fact that the battery level is 30%. It is assumed that the battery level of more than 50% is usually kept. The feature quantity of the operation information is stored in the feature quantity field 1440 of the device information table 1400.

In step S1604, the device 130 makes an authentication request (the main ID, the other ID, the operation information, and date and time) to the information processing apparatus 100. Here, the operation information is the operation information of the other device 160B.

In step S1606, the information processing apparatus 100 acquires information on the main ID in the device information DB 115.

The device information table 1400 at the time 1660 is, for example, as illustrated in (b) of FIG. 16.

In step S1608, the information processing apparatus 100 performs authentication evaluation. The number of occurrences in the device information table 1400 is checked, and the number of occurrences of the other ID: b002 is "2".

In step S1610, the information processing apparatus 100 performs the authentication evaluation. The feature quantity in the device information table 1400 is checked, and it is determined that there is a change in the operation information in the other ID: b002. The feature quantity is extracted from the operation information on the other device 160B at the authentication request time, by using the feature quantity extraction expression, the extracted feature quantity is compared with the feature quantity at the normal time, and for example, if the Mahalanobis' distance is greater than or equal to or greater than a predetermined threshold, determination is made as illegal authentication request. In this example, since the battery level is 30%, the authentication result is not permitted.

In step S1612, the information processing apparatus 100 sends a reply of non-permission to the device 130.

Fourth Exemplary Embodiment

Figure 17:
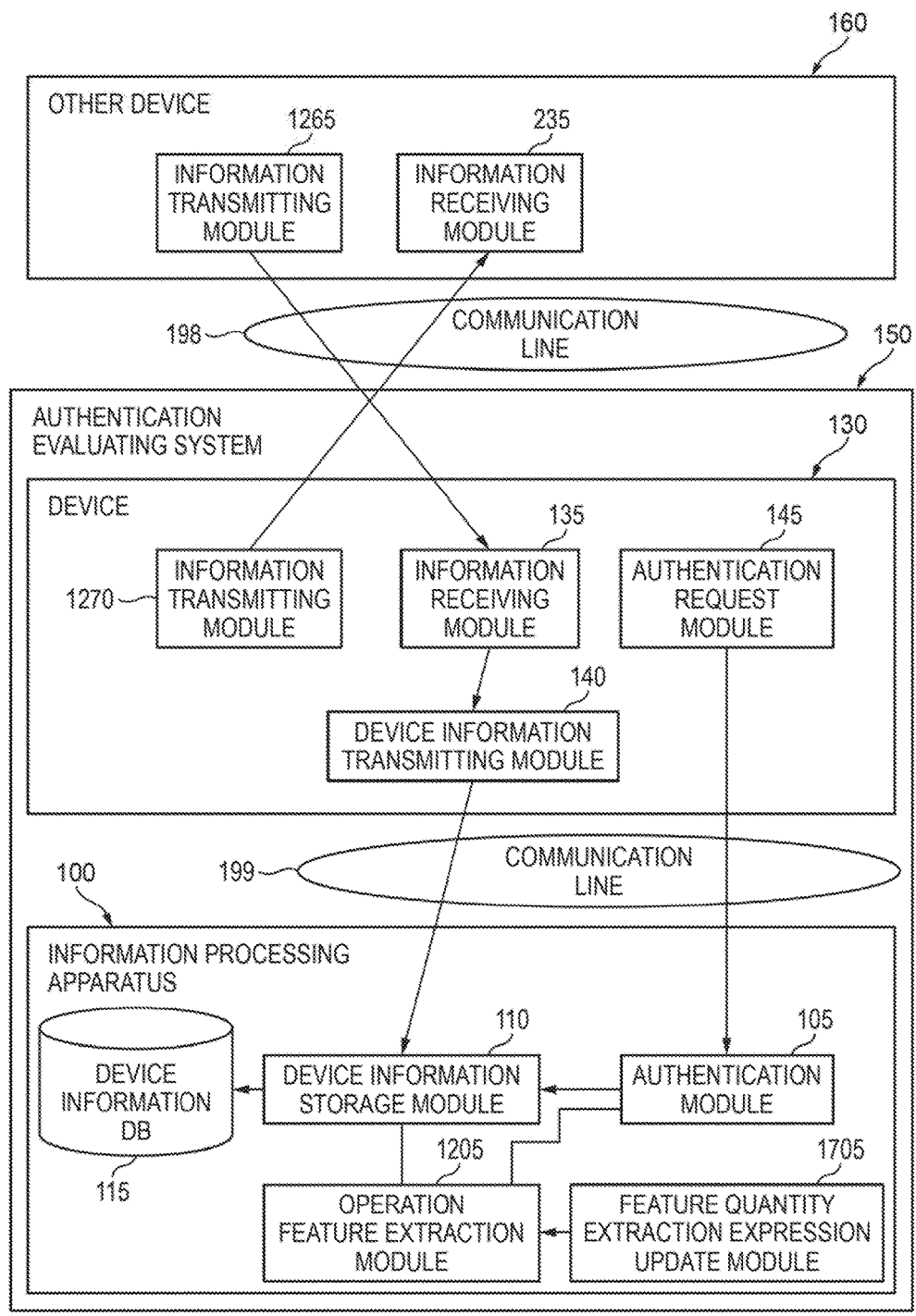
FIG. 17 is a conceptual module configuration diagram for a configuration example of a fourth exemplary embodiment.

FIG. 17 is a conceptual module configuration diagram for a configuration example of a fourth exemplary embodiment.

The information processing apparatus 100 includes the authentication module 105, the operation feature extraction module 1205, the device information storage module 110, the feature quantity extraction expression update module 1705, and the device information DB 115.

The device 130 includes an information receiving module 135, the device information transmitting module 140, the authentication request module 145, and an information transmitting module 1270.

The other device 160 includes an information receiving module 1265 and an information receiving module 235. If compared with the module configuration illustrated in the example of FIG. 12, the feature quantity extraction expression update module 1705 is added in the information processing apparatus 100.

The authentication module 105 is connected to the device information storage module 110 and the operation feature extraction module 1205, and is connected to the authentication request module 145 of the device 130 through the communication line 199.

The device information storage module 110 is connected to the authentication module 105, the operation feature extraction module 1205, and the device information DB 115, and is connected to the device information transmitting module 140 of the device 130 through the communication line 199.

The device information DB 115 is connected to the device information storage module 110.

The operation feature extraction module 1205 is connected to the authentication module 105, the device information storage module 110, and the feature quantity extraction expression update module 1705.

The feature quantity extraction expression update module 1705 is connected to the operation feature extraction module 1205. The feature quantity extraction expression update module 1705 updates the feature quantity extraction expression which is used by the operation feature extraction module 1205. For example, it may be configured to share the feature quantity extraction expression which is used by a different user who uses the device 130. Since the feature quantity extraction expression which is suitable to determine theft possibility varies depending on the life style (for example, people who move a lot, people who do not move, people who are surrounded by many other devices 160, or the like), it is possible to unify the expressions of the user (synonymous with the device 130 that the users are in possession) having the same life style, or update the expressions into expression using a parameter that can find theft from the past theft record.

For example, the feature quantity extraction expression update module 1705 sorts the expressions to the life style class that is predetermined, from the user's usage history of the device 130.

Next, the feature quantity extraction expressions, that are applied to the user in every life style class, are collected, and the theft number is quantified for each extraction expression, from the past theft history. For example, the feature quantity extraction expression having the smallest (or largest) number of thefts is selected.

Finally, the feature quantity extraction expression, used by users who belong to the same life style class, is updated into the selected feature quantity extraction expression.

The information receiving module 135 is connected to the device information transmitting module 140, and is connected to the information receiving module 1265 of the other device 160 through the communication line 198.

The device information transmitting module 140 is connected to the information receiving module 135, and is connected to the device information storage module 110 of the information processing apparatus 100 through the communication line 199.

The authentication request module 145 is connected to the authentication module 105 of the information processing apparatus 100 through the communication line 199.

The information transmitting module 1270 is connected to the information receiving module 235 of the other device 160 through the communication line 198.

The information receiving module 1265 is connected to the information receiving module 135 of the device 130 through the communication line 198.

The information receiving module 235 is connected to the information transmitting module 1270 of the device 130 through the communication line 198.

Figure 18:
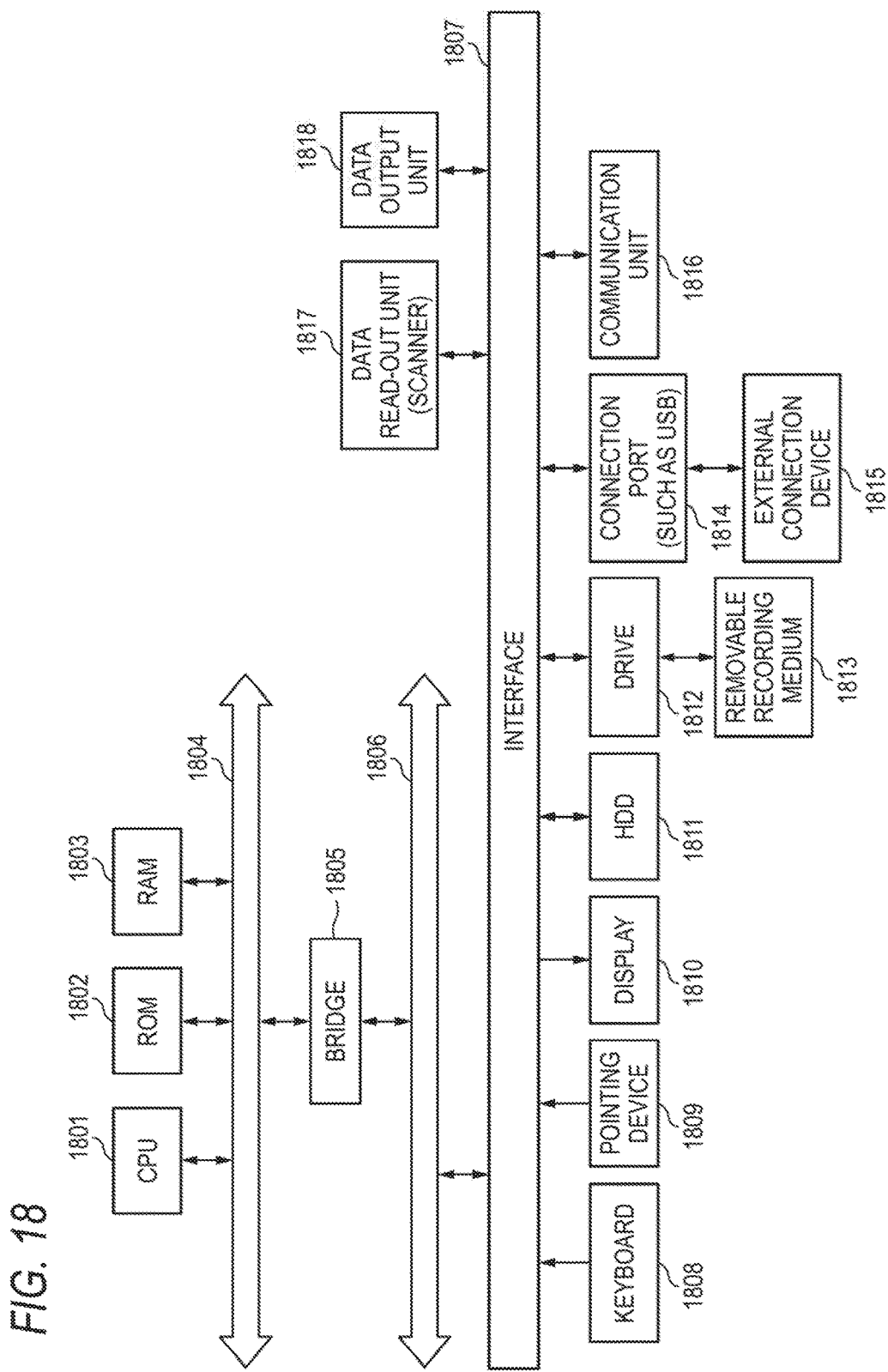
FIG. 18 is a block diagram illustrating a hardware configuration example of a computer which implements the exemplary embodiments.

A hardware configuration example of the information processing apparatus of the present exemplary embodiment will be described with reference to FIG. 18. The configuration illustrated in FIG. 18 is intended to be made by, for example, a personal computer (PC) or the like, and indicates a hardware configuration example including a data read-out unit 1817 such as a scanner, and a data output unit 1818 such as a printer.

A central processing unit (CPU) 1801 is a control unit that executes the processing according to a computer program describing the execution sequences of various modules described in the afore-mentioned exemplary embodiment, that is, the respective modules such as the authentication module 105, the device information storage module 110, the information receiving module 135, the device information transmitting module 140, the authentication request module 145, and the information transmitting module 165.

A read only memory (ROM) 1802 stores programs, operation parameters, and the like used by the CPU 1801. A random access memory (RAM) 1803 stores programs used in execution of the CPU 1801, the parameters that appropriately vary in the execution, and the like. These are connected to each other by a host bus 1804 including a CPU bus or the like.

The host bus 1804 is connected to an external bus 1806 such as a peripheral component interconnect/interface (PCI) bus, through a bridge 1805.

A keyboard 1808 and a pointing device 1809 such as a mouse are devices operated by an operator. A display 1810 is a liquid crystal display apparatus or a cathode ray tube (CRT), or the like, and displays various types of information as text or image information. The display 1810 may be a touch screen or the like which has both functions of the pointing device 1809 and the display 1810.

A hard disk drive (HDD) 1811 incorporates a hard disk (which may be a flash memory, or the like), and drives the hard disk to record or play programs and information to be executed by the CPU 1801.

The hard disk realizes the function as the device information DB 115 or the like. In addition, other various types of data, various computer programs and the like are stored.

A drive 1812 reads data or programs recorded in a removable recording medium 1813 such as a magnetic disk, an optical disk, a magnetooptical disc, or a semiconductor memory, which are installed, and supplies the read data or programs to the RAM 1803 which is connected through an interface 1807, the external bus 1806, the bridge 1805, and the host bus 1804. Incidentally, the removable recording medium 1813 is also available as a data recording area.

A connection port 1814 is a port for connecting an external connection device 1815, and has a connection unit of USB, IEEE1394 or the like. The connection port 1814 is connected to the CPU 1801 or the like through the interface 1807, the external bus 1806, the bridge 1805, the host bus 1804, and the like. A communication unit 1816 is connected to a communication line, and executes a data communication process with external devices. The data read-out unit 1817 is, for example, a scanner, and executes a reading process of the document. The data output unit 1818 is, for example, a printer, and executes an output process of document data.

Incidentally, the hardware configuration of the information processing apparatus illustrated in FIG. 18 is one example configuration, and the present exemplary embodiment is not limited to the configuration illustrated in FIG. 18, and may have a configuration in which the modules described in the present exemplary embodiment are executable. For example, some modules may be configured with dedicated hardware (for example, an application specific integrated circuit (ASIC)), some modules may be in the form as being in the outside of the system and connected through a communication line, or a plurality of the systems illustrated in FIG. 18 may be connected to each other through communication lines and cooperate with each other. In particular, some modules may be incorporated into a portable information communication device, an information appliance, a robot, a copier, a facsimile, a scanner, a printer, a multifunction machine, or the like, in addition to a personal computer.

It should be noted that the above-mentioned various exemplary embodiments may be combined (for example, including adding or replacing modules of a certain exemplary embodiment to or with another exemplary embodiment, or the like), and the techniques described the background may be employed as the processing contents of each module.

Note that the described program may be provided by being stored in a recording medium, or may also be provided by a communication units. In this case, for example, the described program may be regarded as an invention of "computer-readable recording medium having a program thereon".

The "computer-readable recording medium having a program recorded thereon" refers to a computer-readable recording medium on which the program is recorded, which is used for installation, execution, distribution and the like of a program.

Examples of the recording medium include "a DVD-R, a DVD-RW, a DVD-RAM, or the like" which is a digital versatile disk (DVD) and the standard described in a DVD forum, "a DVD+R, a DVD+RW or the like" which is the standard which is established as DVD+RW, a compact disk (CD) such as a read only memory (CD-ROM), CD recordable (CD-R), CD rewritable (CD-RW) or the like, a Blu-ray disc (Blu-ray (registered trademark) disc), a magneto-optical disk (MO), a flexible disk (FD), a magnetic tape, a hard disk, a read-only memory (ROM), an electrically erasable and rewritable read only memory (EEPROM (registered trademark)), a flash memory, a random access memory (RAM), a secure digital (SD) memory card, or the like.

Then, the whole or a part of the program may be recorded on the recording medium, and stored or distributed. Further, the program may be transmitted by communication, for example, by using a transmission medium such as a wired network used in a local area network (LAN), a metropolitan area network (MAN), a wide area network (WAN), the Internet, an intranet, an extranet, or the like, a wireless communication network, and a combination thereof, or may be transmitted on a carrier wave.

Further, the program may be a part or all of other programs, or may be recorded on a recording medium together with another program. Alternatively, the program may be recorded in a plurality of recording media. Further, the program may be recorded in any form if it is restorable such as compression and encryption.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An authentication apparatus comprising:
    a memory that stores information regarding a device and an other device located in the vicinity of the device in association with each other; and
    a processor programmed to:
        in a case where there is an authentication request from the device, receive other device information at a time of the authentication request; and
        authenticate the device based on the information regarding the other device stored in the memory and the other device information that is received at the time of the authentication request, wherein:
    the information regarding the other device and the other device information include information regarding operation of the other device; and
    the operation of the other device includes at least one of a remaining charge amount of a battery, an operation record, an access log of an operating system, a security log, and a sensor log of the other device.

2. The authentication apparatus according to claim 1, wherein
    the processor is further programmed to not permit authentication in a case where the received other device information does not correspond to the information regarding the other device stored in the memory.

3. The authentication apparatus according to claim 1, wherein
    the other device is a device which is portable and able to perform wireless communication.

4. The authentication apparatus according to claim 3, wherein
    the information regarding the other device stored in the memory corresponds to the other device information when the authentication of the device is permitted.

5. The authentication apparatus according to claim 3, wherein
    the information regarding the other device stored in the memory is information transmitted by the device at regular intervals after successful authentication.

6. The authentication apparatus according to claim 5, wherein
    the processor is further programmed to not permit authentication in a case where the received other device information does not correspond to the information regarding the other device stored in the memory.

7. The authentication apparatus according to claim 1, wherein
    the other device is a device which usually does not move and is able to perform wireless communication.

8. The authentication apparatus according to claim 7, wherein
    the information regarding the other device stored in the memory corresponds to the other device information, where the other device is provided in an area registered in advance where using the device is permitted.

9. The authentication apparatus according to claim 7, wherein
    the processor is further programmed to not permit authentication in a case where the received other device information does not correspond to the information regarding the other device stored in the memory.

10. The authentication apparatus according to claim 1, wherein:
    the processor is further programmed to store an expression used to determine a theft possibility for a plurality of lifestyle classes that are classified based on a usage history of a device; and
    the device is authenticated based on (i) the information regarding the other device stored in the memory, (ii) the other device information that is received at the time of the authentication request, and (iii) an expression associated with a respective one of the plurality of lifestyle classes that is selected based on a usage history of the other device.

11. An authentication method comprising:
storing information regarding a device and an other device located in the vicinity of the device in association with each other in a memory;
receiving, in a case where there is an authentication request from the device, other device information at a time of the authentication request; and
authenticating the device based on the information regarding the other device stored in the memory and the other device information that is received at the time of the authentication request, wherein:
the information regarding the other device and the other device information include information regarding operation of the other device; and
the operation of the other device includes at least one of a remaining charge amount of a battery, an operation record, an access log of an operating system, a security log, and a sensor log of the other device.

12. The authentication method according to claim 11, further comprising:
storing an expression used to determine a theft possibility for a plurality of lifestyle classes that are classified based on a usage history of a device, wherein
the device is authenticated based on (i) the information regarding the other device stored in the memory, (ii) the other device information that is received at the time of the authentication request, and (iii) an expression associated with a respective one of the plurality of lifestyle classes that is selected based on a usage history of the other device.

13. A non-transitory computer readable medium storing a program causing a computer to:
store, in a memory, information regarding a device and an other device located in the vicinity of the device in association with each other;
in a case where there is an authentication request from the device, receive other device information at a time of the authentication request; and
authenticate the device based on the information regarding the other device stored in the memory and the other device information that is received at the time of the authentication request, wherein:
the information regarding the other device and the other device information include information regarding operation of the other device; and
the operation of the other device includes at least one of a remaining charge amount of a battery, an operation record, an access log of an operating system, a security log, and a sensor log of the other device.

14. The non-transitory computer readable medium according to claim 13, wherein:
the program further causes the computer to store an expression used to determine a theft possibility for a plurality of lifestyle classes that are classified based on a usage history of a device; and
the device is authenticated based on (i) the information regarding the other device stored in the memory, (ii) the other device information that is received at the time of the authentication request, and (iii) an expression associated with a respective one of the plurality of lifestyle classes that is selected based on a usage history of the other device.

* * * * *